US012714021B2

(12) United States Patent
Infantini et al.

(10) Patent No.: US 12,714,021 B2
(45) Date of Patent: Aug. 25, 2026

(54) SYSTEM AND METHOD FOR AN AGRICULTURAL HARVESTER

(71) Applicant: CNH Industrial America LLC, New Holland, PA (US)

(72) Inventors: Mauricio Blanco Infantini, Sorocaba (BR); João Augusto Marcolin Lucca, Piracicaba (BR); André Satoshi Seki, Sorocaba (BR); Arthur Weschenfelder D'Avila, Florianópolis (BR); Renato Ferreira Simão, Florianópolis (BR); Luciano Campos Rodrigues, Florianópolis (BR); Sidney Roberto Dias De Carvalho, Florianópolis (BR); Alisson Lopes Furlani, Florianópolis (BR); Ramiro Saraiva Da Silva, Florianópolis (BR)

(73) Assignee: CNH Industrial America LLC, New Holland, PA (US)

(*) Notice: Subject to any disclaimer, the term of this patent is extended or adjusted under 35 U.S.C. 154(b) by 164 days.

(21) Appl. No.: 18/457,740

(22) Filed: Aug. 29, 2023

(65) Prior Publication Data

US 2024/0074349 A1 Mar. 7, 2024

(30) Foreign Application Priority Data

Aug. 31, 2022 (BR) ...................... 10 2022 017460 1

(51) Int. Cl.
*A01D 41/127* (2006.01)

(52) U.S. Cl.
CPC ....... *A01D 41/1274* (2013.01); *A01D 41/127* (2013.01); *A01D 41/1271* (2013.01)

(58) Field of Classification Search
CPC ............. A01D 41/1274; A01D 41/127; A01D 41/1271
See application file for complete search history.

(56) References Cited

U.S. PATENT DOCUMENTS

| | | | |
|---|---|---|---|
| 4,487,002 | A | 12/1984 | Kruse et al. |
| 4,727,710 | A | 3/1988 | Kuhn |
| 4,967,544 | A | 11/1990 | Ziegler et al. |
| 6,591,591 | B2 | 7/2003 | Coers et al. |

(Continued)

FOREIGN PATENT DOCUMENTS

WO WO-2019173256 A1 * 9/2019 ......... A01D 41/1275

*Primary Examiner* — Keith D Bloomquist
(74) *Attorney, Agent, or Firm* — Dority & Manning, P.A.

(57) ABSTRACT

A system for an agricultural harvester can include one or more processors and one or more non-transitory computer-readable media. The one or more non-transitory computer-readable media collectively store a machine-learned model configured to receive data associated with one or more harvest-related conditions for an agricultural harvester and process the data to determine a first harvest-related parameter associated with an infeed volume of harvest material for the agricultural harvester and instructions that, when executed by the one or more processors, configure the computing system to perform operations. The operations can include obtaining the data associated with one or more harvest-related conditions, inputting the data into the machine-learned model, and receiving a first value for the harvest-related parameter as a first output of the machine-learned model.

19 Claims, 9 Drawing Sheets

(56) References Cited

U.S. PATENT DOCUMENTS

| | | | | |
|---|---|---|---|---|
| 9,485,905 | B2 | 11/2016 | Jung et al. | |
| 9,668,419 | B2 | 6/2017 | Soldan et al. | |
| 2009/0241499 | A1* | 10/2009 | Maertens | A01D 41/1276 56/11.1 |
| 2018/0129894 | A1* | 5/2018 | Nuske | G06T 7/11 |
| 2018/0196441 | A1 | 7/2018 | Muench et al. | |
| 2019/0069470 | A1 | 3/2019 | Pfeiffer et al. | |
| 2020/0057968 | A1* | 2/2020 | Koob | G06Q 50/02 |
| 2022/0408646 | A1* | 12/2022 | König | A01D 43/082 |
| 2023/0012175 | A1* | 1/2023 | Edo | G06V 10/82 |

* cited by examiner

SYSTEM AND METHOD FOR AN AGRICULTURAL HARVESTER

CROSS-REFERENCE TO RELATED APPLICATION

This application claims the benefit of priority to Brazilian Patent Application No. BR 10 2022 017460 1, entitled "SYSTEM AND METHOD FOR AN AGRICULTURAL HARVESTER," filed on Aug. 31, 2022, and the disclosure of which is incorporated by reference herein in its entirety.

FIELD OF THE INVENTION

The present disclosure relates generally to agricultural harvesters, such as sugarcane harvesters, and, more particularly, to systems and methods for monitoring operational conditions of the agricultural harvester.

BACKGROUND OF THE INVENTION

Typically, agricultural harvesters include an assembly of processing components for processing harvested material. For instance, within a sugarcane harvester, severed sugarcane stalks are conveyed via a feed roller assembly to a chopper assembly that cuts or chops the sugarcane stalks into pieces or billets (e.g., six-inch cane sections). The processed harvested material discharged from the chopper assembly is then directed as a stream of billets and debris into a primary extractor, within which the airborne debris (e.g., dust, dirt, leaves, etc.) is separated from the sugarcane billets. The separated/cleaned billets then fall into an elevator assembly for delivery to an external storage device.

During the operation of the harvester, a power source may be configured to provide motive power to the harvester and/or power one or more components of the harvester. As such, when the power load of each component is altered, the amount of power to be produced is also altered. Accordingly, systems and methods for monitoring the power load of the agricultural harvester would be welcomed in the technology.

BRIEF DESCRIPTION OF THE INVENTION

Aspects and advantages of the invention will be set forth in part in the following description, or may be obvious from the description, or may be learned through practice of the invention.

In some aspects, the present subject matter is directed to a system for an agricultural harvester. The system includes one or more processors and one or more non-transitory computer-readable media that collectively store a machine-learned model configured to receive data associated with one or more harvest-related conditions for an agricultural harvester and process the data to determine a first harvest-related parameter associated with an infeed volume of harvest material for the agricultural harvester and instructions that, when executed by the one or more processors, configure the computing system to perform operations. The operations include obtaining the data associated with one or more harvest-related conditions; inputting the data into the machine-learned model; and receiving a first value for the harvest-related parameter as a first output of the machine-learned model.

In some aspects, the present subject matter is directed to a computer-implemented method for agricultural harvesting. The computer-implemented method includes receiving, by a computing system, data associated with one or more harvest-related conditions for an agricultural harvester. The method also includes inputting, by the computing system, the data into a machine-learned model configured to receive and process the data to determine a first harvest-related parameter indicative of an infeed volume of harvested material for the agricultural harvester. The method further includes receiving, by the computing system, a value for the first harvest-related parameter as an output of the machine-learned model. Lastly, the method includes altering, by the computing system, a ground speed command of the agricultural harvester based at least in part on the first harvest-related parameter.

In some aspects, the present subject matter is directed to a computer-implemented method for agricultural harvesting. The computer-implemented method includes receiving, by a computing system, data associated with one or more harvest-related conditions for an agricultural harvester. The method also includes inputting, by the computing system, the data into a machine-learned model configured to receive and process the data to determine a first harvest-related parameter indicative of a detected foliage ratio for the agricultural harvester. The method further includes receiving, by the computing system, a value for the first harvest-related parameter as an output of the machine-learned model. Lastly, the method includes altering, by the computing system, a ground speed command of the agricultural harvester based at least in part on the first harvest-related parameter.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
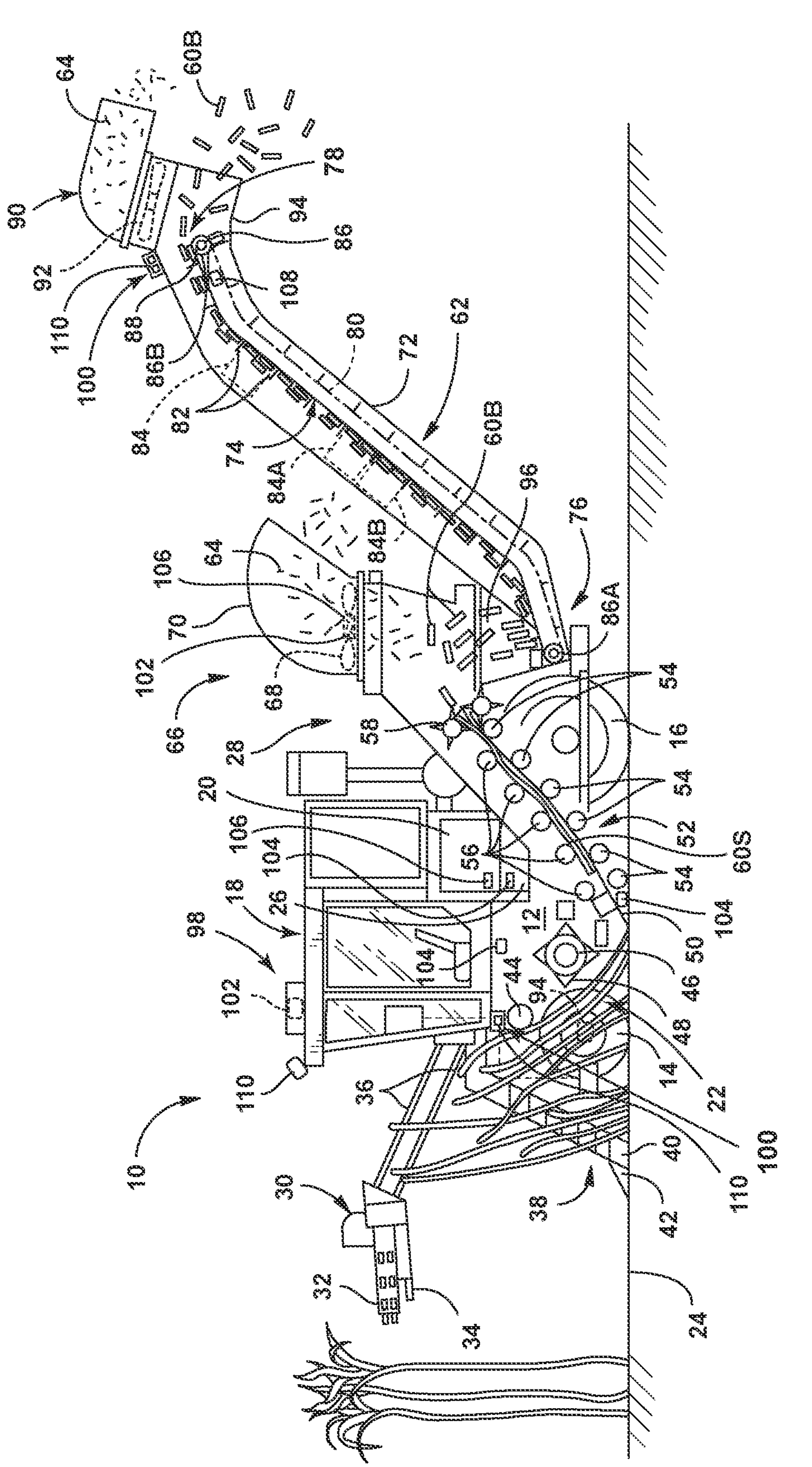
FIG. 1 illustrates a simplified, side view of an agricultural harvester in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part can be used with another embodiment to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a harvested material within a fluid circuit. For example, "upstream" refers to the direction from which a harvested material flows, and "downstream" refers to the direction to which the harvested material moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to systems and methods for agricultural harvesters. In particular, the present subject matter is directed to systems and methods that can include or otherwise leverage a model, which may be a machine-learned model, to determine a value for one or more harvest-related parameters for an agricultural harvester based at least in part on input data associated with one or more harvest-related conditions for the harvester.

In some examples, a computing system can obtain input data from one or more input devices that is associated with one or more harvest-related conditions for an agricultural harvester. For instance, the input device(s) may include one or more onboard sensors configured to monitor one or more parameters and/or conditions associated with the harvester, one or more positioning device(s) for generating position data associated with the location of the harvester, one or more user interfaces for allowing operator inputs to be provided to the system, one or more other internal data sources associated with the harvester, one or more external data sources, and/or the like. The computing system can input the data generated or collected by the input device(s) into a model and, in response, generate one or more harvest-related parameters as outputs of the model. For example, the operation model can be configured to receive input data and process the input data to determine a value indicative of an infeed volume of harvested material and/or a value indicative of a foliage ratio within a processing system of the harvester.

In some examples, the systems and methods provided herein may determine an infeed volume of harvested material based on the value and/or a detected foliage ratio based on the value. The infeed volume of harvested material may be a metric quantifying an amount or volume of crop that enters the processing system of the harvester during a defined time period. The detected foliage ratio is a detected amount of debris relative to an amount of billets within the harvested material downstream of the primary extractor.

Further, the operation model may also be configured to monitor one or more other harvester conditions and/or determine a power load of a chopper assembly based on the infeed volume of harvested material, the detected foliage ration, and/or one or more conditions of the harvester. In some instances, the computing system may also be configured to compare an overall power load of the harvester to a predetermined operating range. The systems and methods of the present disclosure can initiate one or more control actions based on a deviation of the overall power load from the predetermined threshold, an infeed volume of harvested material varying from a defined infeed range, and/or a detected foliage ratio deviating from a threshold of a defined foliage ratio. The defined foliage ratio is an inputted value that defines an amount of debris relative to an amount of billets that is to remain within the harvested material, with the defined amount of debris being removed by the primary extractor. In some instances, the control action can include altering a ground speed of the harvester, which may be accomplished by altering a hydraulic pressure supplied to the driveline assembly.

Through the use of an operation model, the systems and methods of the present disclosure can maintain an infeed volume within a defined range and a detected foliage ratio within a threshold of a defined foliage range while maintaining the power source within a defined operating range. The defined operating range may be an efficiency range in which the power source may be operated above a defined efficiency. For example, in some instances, the operating range may be between 1,500-2,500 revolutions per minute (RPM) when the power source is a combustion engine. However, it will be appreciated that based on the design of the power source, the type of the power source, etc., the defined operating range may vary from one harvester to another.

Referring now to the drawings, FIG. 1 illustrates a side view of an agricultural harvester 10 in accordance with aspects of the present subject matter. As shown, the harvester 10 is configured as a sugarcane harvester. However, in other embodiments, the harvester 10 may correspond to any other suitable agricultural harvester known in the art.

As shown in FIG. 1, the harvester 10 can include a frame 12, a pair of front wheels 14, a pair of rear wheels 16, and an operator's cab 18. The harvester 10 may also include a power source 20 (e.g., an engine mounted on the frame 12) that powers one or both pairs of the wheels 14, 16 via a driveline assembly 22 (e.g., a transmission) to traverse a field 24. Alternatively, the harvester 10 may be a track-driven harvester and, thus, may include tracks driven by the power source 20 as opposed to the illustrated wheels 14, 16. The power source 20 may also drive a hydraulic fluid pump 26 configured to generate pressurized hydraulic fluid to power various components of the harvester 10, which may include the driveline assembly 22.

The harvester 10 may also include a harvested material processing system 28 incorporating various components, assemblies, and/or sub-assemblies of the harvester 10 for cutting, processing, cleaning, and discharging sugarcane as the cane is harvested from an agricultural field 24. For instance, the harvested material processing system 28 may include a topper assembly 30 positioned at the front end portion of the harvester 10 to intercept sugarcane as the harvester 10 is moved in a forward direction. As shown, the topper assembly 30 may include both a gathering disk 32 and a cutting disk 34. The gathering disk 32 may be configured to gather the sugarcane stalks 60S so that the cutting disk 34 may be used to cut off the top of each stalk. As is generally understood, the height of the topper assembly 30 may be adjustable via a pair of arms 36, which may be hydraulically raised and lowered.

The harvested material processing system 28 may further include a harvested material divider 38 that extends upwardly and rearwardly from the field 24. In general, the harvested material divider 38 may include two spiral feed rollers 40. Each feed roller 40 may include a ground shoe 42 at its lower end portion to assist the harvested material divider 38 in gathering the sugarcane stalks 60S for harvesting. Moreover, as shown in FIG. 1, the harvested material processing system 28 may include a knock-down roller 44 positioned near the front wheels 14 and a fin roller 46 positioned behind the knock-down roller 44. As the knock-down roller 44 is rotated, the sugarcane stalks 60S being harvested are knocked down while the harvested material divider 38 gathers the stalks 60S from agricultural field 24. Further, as shown in FIG. 1, the fin roller 46 may include a plurality of intermittently mounted fins 48 that assist in forcing the sugarcane stalks 60S downwardly. As the fin roller 46 is rotated during the harvest, the sugarcane stalks 60S that have been knocked down by the knock-down roller 44 are separated and further knocked down by the fin roller 46 as the harvester 10 continues to be moved in the forward direction relative to the field 24.

Referring still to FIG. 1, the harvested material processing system 28 of the harvester 10 may also include a base cutter assembly 50 positioned behind the fin roller 46. The base cutter assembly 50 may include blades for severing the sugarcane stalks 60S as the cane is being harvested. Additionally, in several embodiments, the blades may be angled downwardly to sever the base of the sugarcane as the cane is knocked down by the fin roller 46.

Moreover, the harvested material processing system 28 may include a feed roller assembly 52 located downstream of the base cutter assembly 50 for moving the severed stalks 60S of sugarcane from base cutter assembly 50 along the processing path of the harvested material processing system 28. As shown in FIG. 1, the feed roller assembly 52 may include a plurality of bottom rollers 54 and a plurality of opposed, top rollers 56. The various bottom and top rollers 54, 56 may be used to pinch the harvested sugarcane during transport. As the sugarcane is transported through the feed roller assembly 52, debris (e.g., rocks, dirt, and/or the like) may be allowed to fall through bottom rollers 54 onto the field 24.

In addition, the harvested material processing system 28 may include a chopper assembly 58 located at the downstream end section of the feed roller assembly 52 (e.g., adjacent to the rearward-most bottom roller 54 and the rearward-most top roller 56). In general, the chopper assembly 58 may be used to cut or chop the severed sugarcane stalks 60S into pieces or "billets" 60B, which may be, for example, six (6) inches long. The billets 60B may then be propelled towards an elevator assembly 62 of the harvested material processing system 28 for delivery to an external receiver or storage device.

The pieces of debris 64 (e.g., dust, dirt, leaves, etc.) separated from the sugarcane billets 60B may be expelled from the harvester 10 through a primary extractor 66 of the harvested material processing system 28, which may be located downstream of the chopper assembly 58 and may be oriented to direct the debris 64 outwardly from the harvester 10. Additionally, an extractor fan 68 may be mounted within an extractor housing 70 of the primary extractor 66 for generating a suction force or vacuum sufficient to force the debris 64 through the primary extractor 66. The separated or cleaned billets 60B, which may be heavier than the debris 64 expelled through the extractor 66, may then be directed into the elevator assembly 62.

As shown in FIG. 1, the elevator assembly 62 may include an elevator housing 72 and an elevator 74 extending within the elevator housing 72 between a lower, proximal end portion 76 and an upper, distal end portion 78. In some examples, the elevator 74 may include a looped chain 80 and a plurality of flights or paddles 82 attached to and spaced on the chain 80. The paddles 82 may be configured to hold the sugarcane billets 60B on the elevator 74 as the sugarcane billets 60B are elevated along a top span of the elevator 74 defined between its proximal and distal end portions 76, 78. A region 84 for retaining the harvested material may be defined between first and second paddles 82 operably coupled with the elevator 74. As such, a first region 84A may be defined between first and second paddles 82, a second region 84B may be defined between the second and a third paddle 82, and so on. Additionally, the elevator 74 may include lower and upper sprockets 86A, 86B positioned at its proximal and distal end portions 76, 78, respectively. As shown in FIG. 1, an elevator motor 88 may be coupled to one of the sprockets (e.g., the upper sprocket 86B) for driving the chain 80, thereby allowing the chain 80 and the paddles 82 to travel in a loop between the proximal and distal ends 76, 78 of the elevator 74.

Moreover, in some embodiments, pieces of debris 64 (e.g., dust, dirt, leaves, etc.) separated from the elevated sugarcane billets 60B may be expelled from the harvester 10 through a secondary extractor 90 of the crop processing system 28 coupled to the rear end portion of the elevator housing 72. For example, the debris 64 expelled by the secondary extractor 90 may be debris 64 remaining after the billets 60B are cleaned and debris 64 expelled by the primary extractor 66. As shown in FIG. 1, the secondary extractor 90 may be located adjacent to the distal end portion 78 of the elevator 74 and may be oriented to direct the debris 64 outwardly from the harvester 10. Additionally, an extractor fan 92 may be mounted at the base of the secondary extractor 90 for generating a suction force or vacuum sufficient to force the debris 64 through the secondary extractor 90. The separated, cleaned billets 60B, heavier than the debris 64 expelled through the primary extractor 66, may then fall from the distal end portion 78 of the elevator 74. In some instances, the billets 60B may fall through an elevator discharge opening 94 defined by the elevator assembly 62 into an external storage device, such as a sugarcane billet cart.

During operation, the harvester 10 traverses the agricultural field 24 for harvesting sugarcane. After the height of the topper assembly 30 is adjusted via the arms 36, the gathering disk 32 on the topper assembly 30 may function to gather the sugarcane stalks 60S as the harvester 10 proceeds across the field 24, while the cutting disk 34 severs the leafy tops of the sugarcane stalks 60S for disposal along either side of harvester 10. As the stalks 60S enter the crop divider 38, the ground shoes 42 may set the operating width to determine the quantity of sugarcane entering the throat of the harvester 10. The spiral feed rollers 40 then gather the stalks 60S into the throat to allow the knock-down roller 44 to bend the stalks 60S downwardly in conjunction with the action of the fin roller 46. Once the stalks 60S are angled downward as shown in FIG. 1, the base cutter assembly 50 may then sever the base of the stalks 60S from field 24. The severed stalks 60S are then, by the movement of the harvester 10, directed to the feed roller assembly 52.

The severed sugarcane stalks 60S are conveyed rearwardly by the bottom and top rollers 54, 56, which compresses the stalks 60S, makes them more uniform, and shakes loose debris 64 to pass through the bottom rollers 54 to the field 24. At the downstream end portion of the feed roller assembly 52, the chopper assembly 58 cuts or chops the compressed sugarcane stalks 60S into pieces or billets 60B (e.g., 6-inch cane sections). The processed crop discharged from the chopper assembly 58 is then directed as a stream of billets 60B and debris 64 into the primary extractor 66. The airborne debris 64 (e.g., dust, dirt, leaves, etc.) separated from the billets 60B is then extracted through the primary extractor 66 using suction created by the extractor fan 68. The separated/cleaned billets 60B then be directed to an elevator hopper 96 into the elevator assembly 62 and travel upwardly via the elevator 74 from its proximal end portion 76 to its distal end portion 78. During normal operation, once the billets 60B reach the distal end portion 78 of the elevator 74, the billets 60B fall through the elevator discharge opening 94 to an external storage device. If provided, the secondary extractor 90 (with the aid of the extractor fan 92) blows out trash/debris 64 from the harvester 10, similar to the primary extractor 66.

In various examples, the harvester 10 may also include a sensor system 98 including one or more sensor assemblies 100 each including various onboard sensor(s) for monitoring one or more operating parameters or conditions of the harvester 10. For instance, the one or more sensor assemblies 100 may include or be associated with various different speed sensors 102 for monitoring the speed of the harvester 10, and/or the operating speed of one or more components of the harvester 10. In several embodiments, the speed sensors 102 may be used to detect or monitor various different speed-related parameters associated with the harvester 10, including, but not limited to, the ground speed of the harvester 10, the engine speed of the harvester's engine (e.g., engine RPM), the elevator speed of the elevator assembly 62, the rotational speed of the blades of the base cutter assembly 50, the rotational speed of the chopper assembly 58, the rotational speed of the rollers 54, 56 of the feed roller assembly 52, the fan speed associated with the primary extractor 66 and/or the secondary extractor 90, and/or any other suitable operating speeds associated with the harvester 10. For example, as shown in FIG. 1, a first speed sensor 102 is provided in operative association with the primary extractor 66 (e.g., a rotational speed sensor provided in association with the elevator motor 88) to allow the fan speed to be monitored, while a second speed sensor 102 (e.g., a wheel speed sensor or a GPS-enabled device) may be provided in operative association with another component of the harvester 10 (e.g., the wheels 14, 16 and/or cab 18) to allow the ground speed of the harvester 10 to be continuously monitored.

Additionally, in several embodiments, the one or more sensor assemblies 100 may include or incorporate one or more position sensors 104 used to monitor one or more corresponding position-related parameters associated with the harvester 10. Position-related parameters that may be monitored via the position sensor(s) 104 include, but are not limited to, the cutting height of the base cutter assembly 50, the relative positioning of the bottom and top rollers 54, 56 of the feed roller assembly 52, the vertical travel or position of the chassis or frame 12 of the harvester 10, and/or any other suitable position-related parameters associated with the harvester 10. For instance, as shown in FIG. 1, a position sensor 104 may be mounted to the harvester's frame 12 to monitor the vertical position or travel of the chassis relative to a given reference point.

Moreover, in several embodiments, the one or more sensor assemblies 100 may include or incorporate one or more pressure sensors 106 used to monitor one or more corresponding pressure-related conditions or parameters associated with the harvester 10. For instance, pressure-related conditions or parameters that may be monitored via the pressure sensor(s) 106 include, but are not limited to, the fluid pressures associated with the hydraulic fluid supplied to one or more hydraulic components of the harvester 10, such as hydraulic motor(s) 112 (FIG. 7) rotationally driving the topper assembly 30 (e.g., gathering disk pressure and/or the cutting disk pressure), hydraulic motor(s) 114 (FIG. 7) rotationally driving the base cutter assembly 50 (e.g., the base cutter pressure), hydraulic motor(s) 116 (FIG. 7) rotationally driving the feed roller assembly 50, hydraulic motor(s) 118 (FIG. 7) rotationally driving the chopper assembly 58, hydraulic motor(s) 120 (FIG. 7) rotationally driving the fan 68 of the primary extractor 66, hydraulic motor(s) 122 (FIG. 7) rotationally driving the elevator assembly 62, hydraulic motor(s) 124 (FIG. 7) rotationally driving the secondary extractor 90, and/or any other suitable pressure-related conditions or parameters associated with the harvester 10. For instance, as shown in FIG. 1, a pressure sensor 106 may be provided in operative association with the base cutter assembly 50 to monitor the base cutter pressure.

It will be appreciated that the one or more sensor assemblies 100 may also include various other sensors or sensing devices. In some embodiments, the harvester 10 may include or incorporate one or more load sensors 108 (e.g., one or more load cells or sensorized load plates) used to monitor one or more corresponding load-related conditions or parameters associated with the harvester 10. For instance, as shown in FIG. 1, one or more load sensors 108 may be provided in operative association with the elevator assembly 62 to allow the weight or mass flow rate of the crops being directed through the elevator 74 to be monitored.

Additionally, in some embodiments, the sensor assembly 100 may include or incorporate one or more vision-based or wave-based sensors 110 (e.g., one or more cameras, radar sensors, ultrasound sensors, LIDAR devices, etc.) used to capture sensor data indicative of one or more observable conditions or parameters associated with the harvester 10, such as by providing a camera or LIDAR device to allow the potential incoming infeed volume of harvested material based on the crop within the field 24 to be estimated based on the received vision-based data (e.g., image(s)) or by providing an installed camera or radar device to allow sensor data to be captured that is associated with the detected foliage ratio of the crops at the elevator 74 and/or within any of location of the harvester 10, and/or the mass of the harvested material through the crop processing system 28. For instance, as shown in FIG. 1, a forward looking vision-based sensor 110 may be installed on the cab 18 with a field of view directed in front of the harvester 10 to allow images or other vision-based data to be captured that provides an indication of the upcoming incoming infeed volume of harvested material based on the crop within the field 24. Additionally or alternatively, as shown in FIG. 1, a vision-based sensor 110 may be installed proximate to the knock-down roller 44 with a field of view directed towards an infeed location of the crop entering the harvester 10 to allow images or other vision-based data to be captured that provides an indication of the upcoming infeed volume of harvested material within the field 24. Additionally or alternatively, as shown in FIG. 1, one or more vision-based sensors 110 may be installed proximate to the elevator housing 72 with a field of view directed towards the elevator 74 to allow images or other vision-based data to be captured that provide an indication of the debris 64 and/or stalks 60S, or billets 60B, (i.e., detected foliage ratio) downstream of the primary extractor 66.

Figure 2:
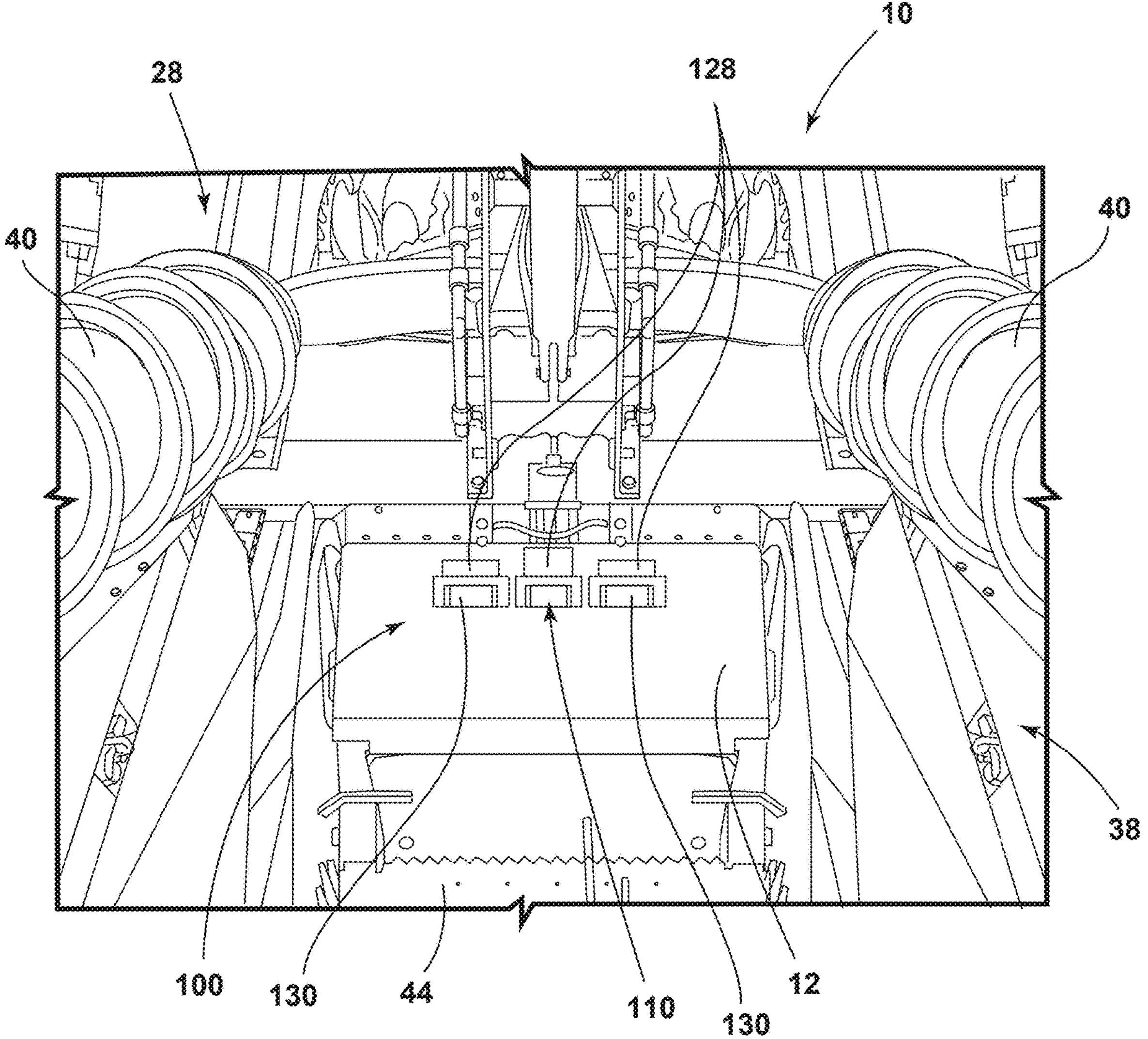
FIG. 2 illustrates a perspective view of a front portion of the agricultural harvester in accordance with aspects of the present subject matter.
Figure 3:
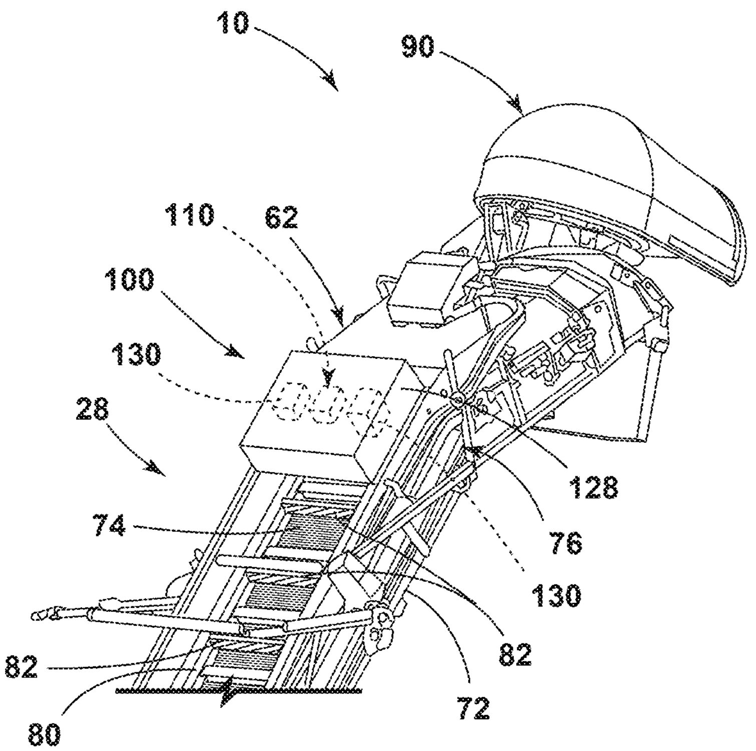
FIG. 3 illustrates a perspective view of a rear portion of the agricultural harvester in accordance with aspects of the present subject matter.

Referring now to FIGS. 2 and 3, a perspective view of a front portion of the agricultural harvester 10 and a perspective view of a rear portion of the agricultural harvester 10 are respectively illustrated in accordance with aspects of the present subject. As shown in FIGS. 2, the sensor assembly 100 may be operably coupled with the frame 12 and installed proximate to the knock-down roller 44, or any other location. The sensor assembly 100 can include a sensor housing 128, one or more vision-based sensors 110, and/or one or more light sources 130. The one or more vision-based sensors 110 can capture images or other vision-based data forwardly of the feed roller. As such, the sensor assembly 100 can capture data indicative of an upcoming infeed volume of harvested material within the field 24. Additionally or alternatively, as shown in FIG. 3, the sensor assembly 100 may be installed proximately and/or operably coupled to the elevator housing 72. As provided above, the sensor assembly 100 can include a sensor housing 128, one or more vision-based sensors 110, and/or one or more light sources 130. The one or more vision-based sensors 110 can capture images or other vision-based data within the elevator assembly 62. As such, the sensor assembly 100 can capture data indicative of the debris 64 and/or stalks 60S, or billets 60B, (i.e., detected foliage ratio) downstream of the primary extractor 66.

With further reference to FIGS. 2 and 3, in various examples, each of the one or more vision-based sensors 110 may be configured as an area-type image sensor, such as a CCD or a CMOS image sensor, and image-capturing optics that capture an image of an imaging field. In various embodiments, the image sensor may correspond to a stereographic camera having two or more lenses with a separate image sensor for each lens to allow the camera to capture stereographic or three-dimensional images.

The one or more light sources 130 may be operably coupled with the computing system 202 and configured to illuminate an area within the field of view of the one or more vision-based sensors 110. The one or more light sources 130 may be any lighting apparatuses suitable for illuminating a portion of the elevator 74, such as light-emitting diodes (LED), tungsten-based light sources, halogen-based light sources, high-intensity discharge (HID) sources, such as xenon, laser-based light sources, vertical-cavity surface-emitting laser-based light sources (VCSEL), etc. In some instances, the one or more light sources can be near-infrared (NIR) lamps positioned near the sensors 110 to illuminate the environment in low-light conditions for the sensors 110.

In operation, a system 200 (FIG. 4) may evaluate an infeed of harvest material entering the harvester 10 through data captured by the forward looking sensor assembly 100 and one or more operating conditions of the harvester 10 through data captured by the sensor assembly 100 operably coupled with the elevator assembly 62. When the amount of harvest material at the infeed is varied, a harvest-related parameter of one or more components (e.g., the driveline (FIG. 1)) may be reactively and/or proactively adjusted to maintain an infeed volume of harvest material within a defined infeed range, to maintain the operation of a power source 20 within a defined operating range, and/or to maintain a detected foliage ratio within a defined foliage range. As will be described below, the harvest-related parameter of the harvester 10 (e.g., the ground speed of the harvester 10, the suction of the primary extractor 66, etc.) may be estimated or determined using a machine-learned model that has been trained or otherwise developed to output the harvest-related parameter based on a correlation between such parameter and various inputs into the model. For instance, in several embodiments, the inputs into the machine-learned model may include data associated with one or more "harvest-related" conditions, which can, include, but are not limited to, harvest-related parameters and settings of the harvester 10 (e.g., sensed or calculated operating parameters or operator-selected settings), vehicle commands for the harvester 10, vehicle configuration settings, application-related conditions, field-related conditions, and/or the like. For instance, harvest-related condition data may include, but is not limited to, data associated with any one or a combination of engine speed, ground speed, elevator speed, base cutter height, base cutter pressure, chopper speed, chopper pressure, floating roller position or displacement, the vertical position or travel of the chassis or frame 12, the fan speed associated with the primary and/or secondary extractor 66, 90, hydraulic motor usage, foliage ratio, base cutter direction (forward or reverse), raising or lowering of the topper assembly 30, raising or lowering of the suspension, the model/type of the chopper assembly 58, the size of the elevator assembly 62, tire/track conditions, the region within which the harvester 10 is operating, farm-specific conditions, time-related conditions (day/night), humidity data, field NDVI data, yield prediction data, soil analysis data, and/or the like. Such data may be, for example: based directly or indirectly on sensor data received from onboard sensors; calculated or determined by the harvester's computing system 202 based on data accessible to such system (e.g., including internally derived or externally derived data); received from the operator (e.g., via a user interface); received from an external source (e.g., a remote server or separate computing device); and/or the like.

Figure 4:
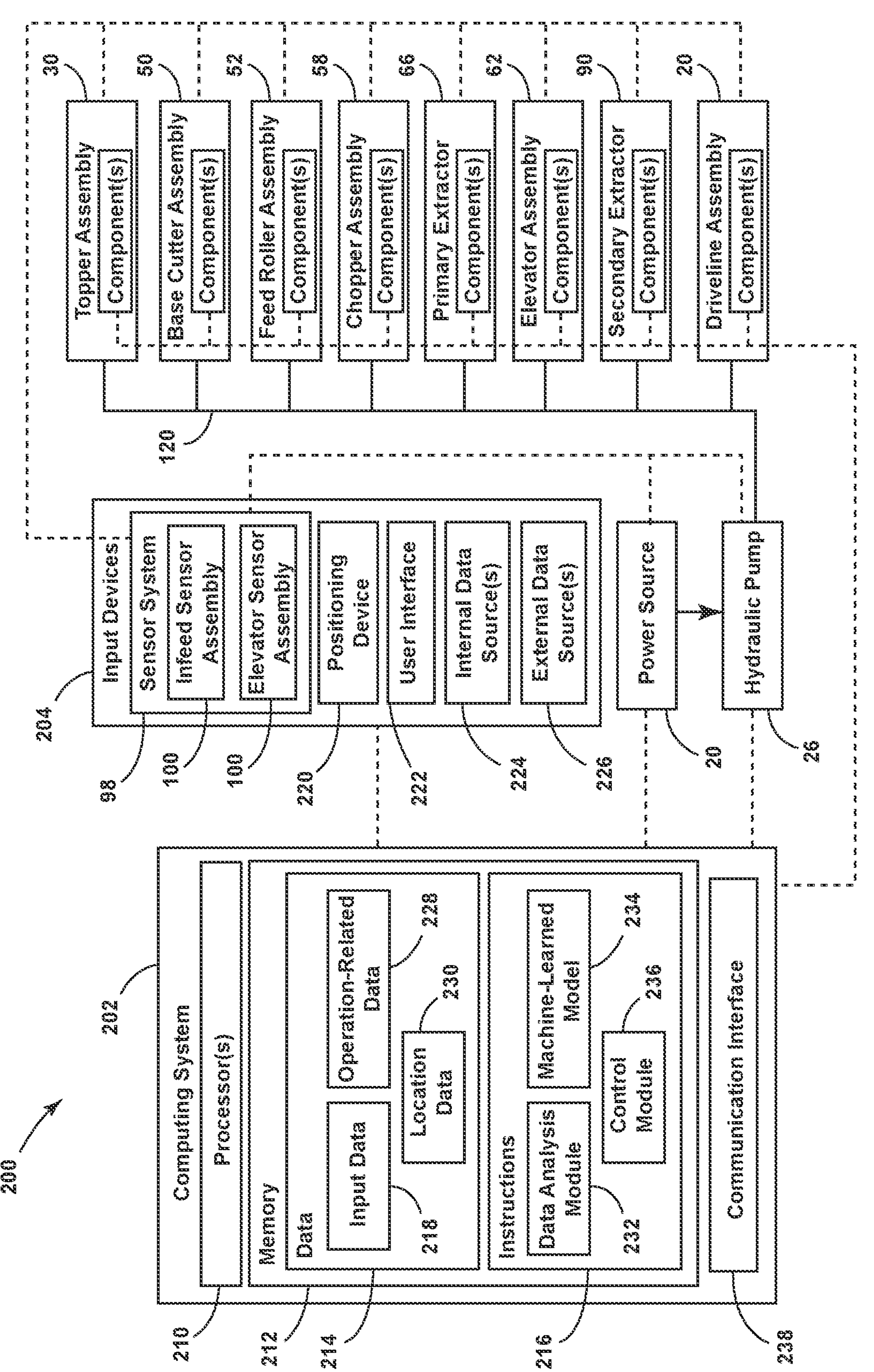
FIG. 4 illustrates a schematic view of a system for a harvesting operation in accordance with aspects of the present subject matter.
Figure 5:
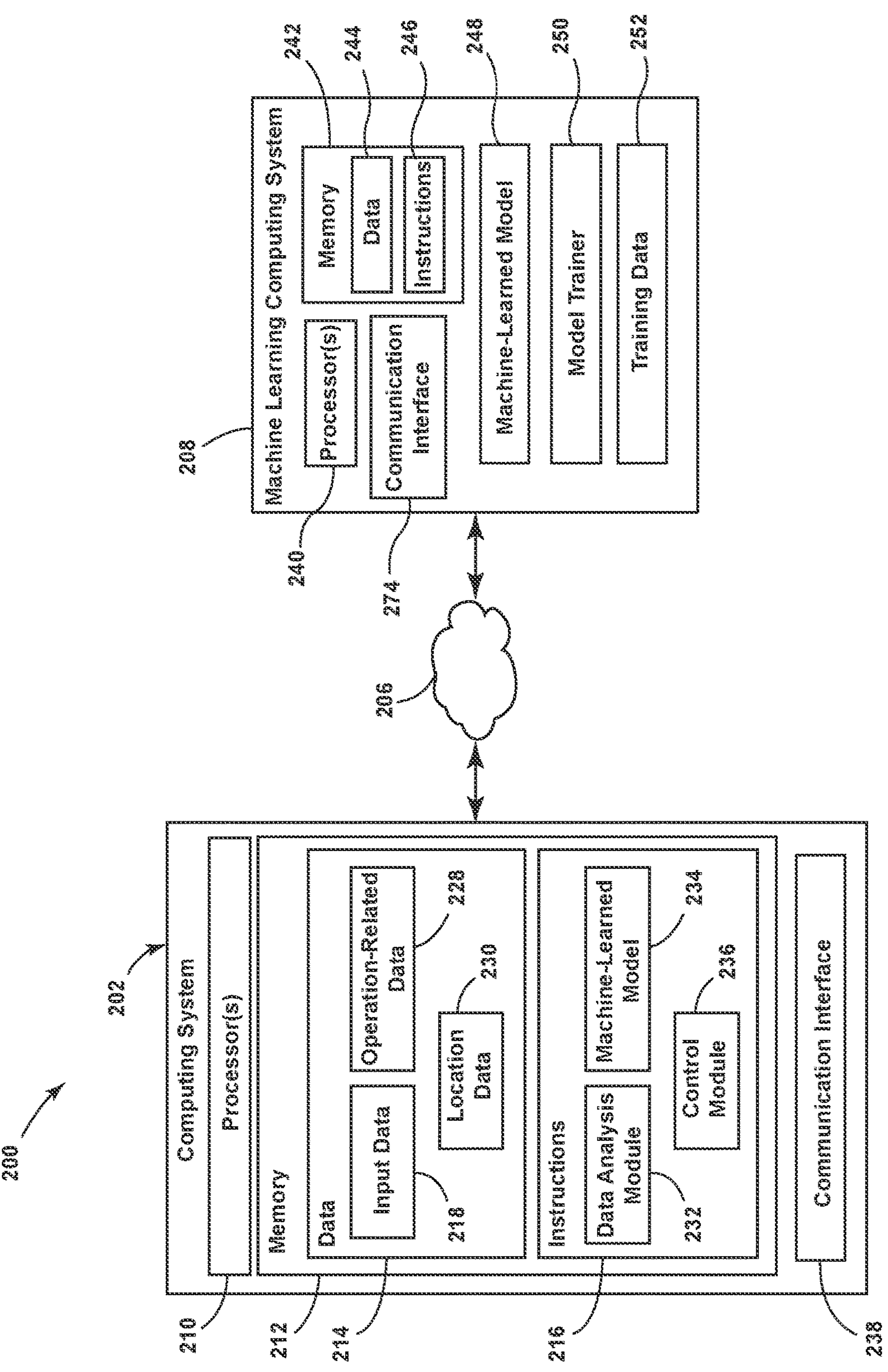
FIG. 5 illustrates a schematic view of a computing system for a harvesting operation in accordance with aspects of the present subject matter.

Referring now to FIGS. 4 and 5, schematic views of embodiments of a system 200 are illustrated in accordance with aspects of the present subject matter. In general, the system 200 will be described herein with reference to the harvester 10 described above with reference to FIGS. 1-3. However, It will be appreciated that the disclosed system 200 may generally be utilized with harvesters having any suitable harvester configuration.

In several embodiments, the system 200 may include a computing system 202 and various other components configured to be communicatively coupled to and/or controlled by the computing system 202, such as various input devices 204 and/or various components of the harvester 10. In some embodiments, the computing system 202 is physically coupled to the harvester 10. In other embodiments, the computing system 202 is not physically coupled to the harvester 10 (e.g., the computing system 202 may be remotely located from the harvester 10) and instead may communicate with the harvester 10 over a wireless network.

FIG. 4 illustrates a computing environment in which the computing system 202 can operate to determine one or more harvest-related parameters and, further, to initiate one or more control actions associated with a harvester 10, such as by controlling one or more components of the harvester 10 (e.g., the power source 20, the driveline assembly 22, the pump 26 and/or hydraulic system components, harvested material processing system components, etc.) based on the one or more harvest-related parameters. That is, FIG. 4 illustrates a computing environment in which the computing system 202 is actively used in conjunction with a harvester 10 (e.g., during the operation of the harvester 10 within a field 24). As will be discussed further below, FIG. 5 depicts a computing environment in which the computing system 202 can communicate over a network 206 with a machine learning computing system 208 to train and/or receive a machine-learned model 234. Thus, FIG. 5 illustrates the operation of the computing system 202 to train a machine-learned model 234 and/or to receive a trained machine-learned model 234 from a machine learning computing system 208 (e.g., FIG. 5 shows the "training stage") while FIG. 4 illustrates the operation of the computing system 202 to use the machine-learned model 234 to actively determine a harvest-related parameter(s) for the harvester 10 (e.g., FIG. 4 shows the "inference stage").

Referring first to FIG. 4, in general, the computing system 202 may correspond to any suitable processor-based device(s), such as a computing device or any combination of computing devices. Thus, as shown in FIG. 4, the computing system 202 may generally include one or more processor(s) 210 and associated memory devices 212 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory 212 may generally include memory element(s) including, but not limited to, computer-readable medium (e.g., random access memory (RAM)), computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 212 may generally be configured to store information accessible to the processor(s) 210, including data 214 that can be retrieved, manipulated, created, and/or stored by the processor(s) 210 and instructions 216 that can be executed by the processor(s) 210.

In several embodiments, the data 214 may be stored in one or more databases. For example, the memory 212 may include an input database 218 for storing input data received from the input device(s) 204. For example, the input device(s) 204 may include the one or more sensor assemblies 100 of the sensor system 98 each including one or more sensors configured to monitor one or more conditions associated with the harvester 10 and/or the operation being performed therewith (e.g., including one or more of the various sensors 102, 104, 106, 108, 110 described above), one or more positioning device(s) 220 for generating position data associated with the location of the harvester 10, one or more user interfaces 222 for allowing operator inputs to be provided to the computing system 202 (e.g., buttons, knobs, dials, levers, joysticks, touch screens, and/or the like), one or more other internal data sources 224 associated with the harvester 10 (e.g., other devices, databases, etc.), one or more external data sources 226 (e.g., a remote computing device or sever, including, for instance, the machine-learning computing system 208 of FIG. 5), and/or any other suitable input device(s) 204. The data received from the input device(s) 204 may, for example, be stored within the input database 218 for subsequent processing and/or analysis.

In several embodiments, the computing system 202 may be configured to receive data from the input device(s) 204 that is associated with one or more "harvest-related" conditions. The harvest-related condition data may, for example, be: based directly or indirectly on sensor data received from the sensor system 98 and/or location data received from the positioning device(s) 220; calculated or determined by the computing system 202 based on any data accessible to the system 200 (e.g., including data accessed, received, or transmitted from internal data sources 224 and/or external data sources 226); received from the operator (e.g., via the user interface 222); and/or the like. As indicated above, harvest-related conditions may include, but are not limited to, sensed or calculated operational conditions of the harvester 10, operator-selected settings for the harvester 10, vehicle commands for the harvester 10, vehicle configuration conditions, application-related conditions, field-related conditions, and/or the like. For instance, examples of harvest-related conditions include, but are not limited to, engine speed, ground speed, elevator speed, base cutter height, base cutter pressure, chopper speed, chopper pressure, floating roller position or displacement, the vertical position or travel of the chassis or frame 12, a fan speed associated with the primary and/or secondary extractor 66, 90, hydraulic motor usage, detected foliage ratio, base cutter direction (forward or reverse), raising or lowering of the topper assembly 30, raising or lowering of the suspension, the model/type of the chopper assembly 58, the size of the elevator assembly 62, tire/track conditions, the region within which the harvester 10 is operating, farm-specific conditions, time-related conditions (day/night), humidity data, field NDVI data, yield prediction data, power load data for the harvester 10, power load data for one or more components of the harvester 10, and/or the like.

It will be appreciated that, in addition to being considered an input device(s) that allows an operator to provide inputs to the computing system 202, the user interface 222 may also function as an output device. For example, the user interface 222 may be configured to allow the computing system 202 to provide feedback to the operator (e.g., visual feedback via a display or other presentation device, audio feedback via a speaker or other audio output device, and/or the like).

Additionally, as shown in FIG. 4, the memory 212 may include a harvest-related database 228 for storing information or data associated with the harvest-related parameter(s) for the harvester 10. For example, as indicated above, based on the input data received from the input device(s) 204, the computing system 202 may be configured to estimate or calculate one or more values for harvest-related parameters associated with the harvester 10, such as a value(s) for harvest-related parameters indicative of an infeed volume of harvest material and/or a detected foliage ratio. The harvest-related parameter value(s) estimated or calculated by the computing system 202 may then be stored within the harvest-related database 228 for subsequent processing and/or analysis.

Moreover, in several embodiments, the memory 212 may also include a location database 230 storing location information about the harvester 10 and/or information about the field 24 being processed (e.g., a field map). Such location database 230 may, for example, correspond to a separate database or may form part of the input database 218. As shown in FIG. 3, the computing system 202 may be communicatively coupled to the positioning device(s) 220 installed on or within the harvester 10. For example, in some embodiments, the positioning device(s) 220 may be configured to determine the exact location of the harvester 10 using a satellite navigation position system (e.g., a GPS, a Galileo positioning system, the Global Navigation satellite system (GLONASS), the BeiDou Satellite Navigation and Positioning system, and/or the like). In such an embodiment, the location determined by the positioning device(s) 220 may be transmitted to the computing system 202 (e.g., in the form of coordinates) and subsequently stored within the location database 230 for subsequent processing and/or analysis.

Additionally, in several embodiments, the location data stored within the location database 230 may also be correlated to all or a portion of the input data stored within the input database 218. For instance, in some embodiments, the location coordinates derived from the positioning device(s) 220 and the data received from the input device(s) 204 may both be time-stamped. In such an embodiment, the time-stamped data may allow the data received from the input device(s) 204 to be matched or correlated to a corresponding set of location coordinates received from the positioning device(s) 220, thereby allowing the precise location of the portion of the field 24 associated with the input data to be known (or at least capable of calculation) by the computing system 202.

Moreover, by matching the input data to a corresponding set of location coordinates, the computing system 202 may also be configured to generate or update a corresponding field map associated with the field 24 being processed. For example, in instances in which the computing system 202 already includes a field map stored within its memory 212 that includes location coordinates associated with various points across the field 24, the input data received from the input device(s) 204 may be mapped or correlated to a given location within the field map. Alternatively, based on the location data and the associated image data, the computing system 202 may be configured to generate a field map for the field 24 that includes the geo-located input data associated therewith.

Likewise, any harvest-related parameter derived from a particular set of input data (e.g., a set of input data received at a given time or within a given time period) can also be matched to a corresponding set of location coordinates. For example, the particular location data associated with a particular set of input data can simply be inherited by any harvest-related data produced on the basis of or otherwise derived from such set of input data 218. Thus, based on the location data and the associated harvest-related data, the computing system 202 may be configured to generate a field map for the field 24 that describes, for each analyzed portion of the field 24, one or more corresponding harvest-related parameter values, such as an infeed volume of harvest material and/or a detected foliage ratio. Such a map can be consulted to identify discrepancies in or other characteristics of the harvest-related parameters at or among various granular locations within the field 24.

Referring still to FIG. 4, in several embodiments, the instructions 216 stored within the memory 212 of the computing system 202 may be executed by the processor(s) 210 to implement a data analysis module 232. In general, the data analysis module 232 may be configured to analyze the input data (e.g., a set of input data received at a given time or within a given time period or a subset of the data, which may be determined through a pre-processing method) to determine the harvest-related parameters with one or more models (e.g., a first model unit for determining a value indicative of a first harvest-related parameter and a second model unit for determining a value indicative of a second harvest-related parameter) using any algorithm(s). In particular, as will be discussed further below, the data analysis module 232 can cooperatively operate with or otherwise leverage a machine-learned model 234 to analyze the input data 218 to determine the harvest-related parameter(s). As an example, the data analysis module 232 can perform some or all of method 300 of FIG. 7.

Referring still to FIG. 4, the instructions 216 stored within the memory 212 of the computing system 202 may also be executed by the processor(s) 210 to implement a control module 236. In general, the control module 236 may be configured to adjust the operation of the harvester 10 by controlling one or more components of the harvester 10. In several embodiments, the control module 236 may be configured to automatically control the operation of one or more harvester components based at least in part on one or more harvest-related parameters each determined as a function of the input data. Thus, the system 200 can reactively manage various harvest-related parameters of the harvester 10 based on the value(s) of the harvest-related parameters that is output, for instance, from the machine-learned operation model 234.

As indicated above, the harvest-related parameter may correspond to a detected infeed volume of harvested material. In various examples, the model may be configured to utilize any suitable image processing algorithm(s) to determine the infeed volume of harvested material. In some embodiments, a texture-based algorithm may be utilized that relies on the orientations of image gradients to determine the volume of harvested materials. For instance, stalks 60S may be characterized by a high number of gradients in the same direction due to the straightness of the stalks 60S. Thus, by identifying the gradient orientations within the images, the volume of harvested material may be determined in the images. In other embodiments, a color-based algorithm may be utilized that relies on color differences to differentiate between stalk pixels in images. In further embodiments, an algorithm that identifies the differences in the reflectivity or spectral absorption between adjacent stalks 60S may be utilized to determine the infeed volume contained within each image. When the infeed volume of the harvested material is varied, an operating condition of one or more components may be adjusted, which may be done to maintain the power source 20 within a defined operating range and/or to maintain the detected foliage ratio within a defined foliage range.

In some examples, if the infeed volume of harvest material is higher than expected (e.g., higher than a defined infeed range), the operational settings of one or more components of the harvester 10 may, for example, be automatically adjusted to increase a ground speed of the harvester 10 to increase the infeed volume of harvest material. Likewise, if the infeed volume of harvest material is lower than expected (e.g., lower than a defined infeed range), the operational settings of one or more components of the harvester 10 may, for example, be automatically adjusted to reduce the ground speed of the harvester 10 to reduce the infeed volume of harvest material.

Additionally or alternatively, the one or more harvest-related parameters may correspond to a detected foliage ratio of the harvested material at the elevator 74 and/or within any location of the harvester 10. In various examples, the model may be configured to utilize any suitable image processing algorithm(s) to distinguish debris 64 from stalks 60S (or any other object) within processed images of the harvested material. In some embodiments, a texture-based algorithm may be utilized that relies on the orientations of image gradients to differentiate debris 64 from stalks 60S. For instance, stalks 60S may be characterized by a high number of gradients in the same direction due to the straightness of the stalks 60S, whereas debris 64 gradients are more randomly oriented. Thus, by identifying the gradient orientations within the images, the pixels can be analyzed to classify the harvested material as stalks 60S or debris 64. In other embodiments, a color-based algorithm may be utilized that relies on color differences to differentiate between debris pixels from stalk pixels. In further embodiments, the model may include an algorithm that identifies the differences in the reflectivity or spectral absorption between the debris 64 and the stalks 60S contained within each image.

In some examples, if the detected foliage ratio of the harvested material at the elevator 74 is lower than expected (e.g., lower than a defined foliage ratio), the operational settings of one or more components of the harvester 10 may, for example, be automatically adjusted to reduce the speed of the fan 68 of the primary extractor 66 and/or the suction of the primary extractor 66 to remove less debris 64 from the harvester 10. Likewise, if the detected foliage ratio of the harvested material downstream of the primary extractor 66 is higher than expected (e.g., higher than a defined foliage ratio), the operational settings of one or more components of the harvester 10 may, for example, be automatically adjusted to increase a speed of the fan 68 of the primary extractor 66 and/or suction of the primary extractor 66 to remove additional debris 64 from the harvester 10. Moreover, if the speed of the fan 68 of the primary extractor 66 cannot be increased or it is not desirable to increase the fan speed, alternative control actions may be initiated. For instance, the ground speed of the harvester 10 may be reduced rather than increasing the speed of the fan.

In addition to such automatic control of the harvester 10 operation, the computing system 202 may also be configured to initiate one or more other control actions associated with or related to the harvest-related parameters determined using the machine-learned model 234. For example, the computing system 202 may monitor a power load of the harvester 10, a change in power load based on the adjustment to the primary extractor 66, and/or a projected change in power load based on an upcoming change in power load of the primary extractor 66. In turn, the change in power load and/or the projected change in power load may be compared to an efficiency chart of the power source 20, which can determine an efficient operating range for the power source 20. Based on the comparison between the change in power load and/or the projected change in power load, the computing system 202 may initiate one or more other control actions associated with or related to the harvest-related parameter determined using the machine-learned model 234.

In several embodiments, the computing system 202 may also automatically control the operation of the user interface 222 to provide an operator notification associated with the determined harvest-related parameter. For instance, in some embodiments, the computing system 202 may control the operation of the user interface 222 in a manner that causes data associated with the determined harvest-related parameter to be presented to the operator of the harvester 10, such as by presenting raw or processed data associated with the harvest-related parameter including numerical values, graphs, maps, and/or any other suitable visual indicators.

Additionally, in some embodiments, the control action initiated by the computing system 202 may be associated with the generation of a yield map based at least in part on the values for the harvest-related parameter output from the machine-learned model 234. For instance, as indicated above, the location coordinates derived from the positioning device(s) 220 and the harvest-related data may both be time-stamped. In such an embodiment, the time-stamped data may allow each harvest-related parameter value or datapoint to be matched or correlated to a corresponding set of location coordinates received from the positioning device(s) 220, thereby allowing the precise location of the portion of the field 24 associated with the value/datapoint to be determined by the computing system 202. The resulting yield map may, for example, simply correspond to a data table that maps or correlates each harvest-related datapoint to an associated field location. Alternatively, the yield map may be presented as a geo-spatial mapping of the harvest-related data, such as a heat map that indicates the variability in the harvest-related parameter across the field 24.

Moreover, as shown in FIG. 4, the computing system 202 may also include a communications interface 238 to communicate with any of the various other system components described herein. For instance, one or more communicative links or interfaces (e.g., one or more data buses and/or wireless connections) may be provided between the communications interface and the input device(s) 204 to allow data transmitted from the input device(s) 204 to be received by the computing system 202. Additionally, as shown in FIG. 4, one or more communicative links or interfaces (e.g., one or more data buses and/or wireless connections) may be provided between the communications interface 238 and one or more electronically controlled components of the harvester 10 to allow the computing system 202 to control the operation of such system components.

Referring now to FIG. 5, in some examples, the computing system 202 can store or include one or more machine-learned models 234. The machine-learned operation model 234 can be configured to receive input data and process the input data to determine one or more harvest-related parameters associated with the harvester 10. As provided herein, the system 200 may be configured to determine a detected foliage ratio between debris 64 (FIG. 1) and stalk 60S (FIG. 1) downstream of the primary extractor 66 using a model, which may be a machine-learned model 234. The system 200 may compare the detected foliage ratio to a defined foliage ratio and calculate an error between the ratios. In turn, the system 200 may utilize a model, which may be a machine-learned model 234, to determine an operational setpoint (e.g., a speed setpoint) of the primary extractor 66 based on the error between the defined foliage ratio and the detected foliage ratio. In addition, the system 200 may utilize a model, which may be a machine-learned model 234, to determine an infeed volume of harvested material of the harvester 10 and determine whether the infeed volume of harvested material is within a defined infeed range. When the infeed volume of harvested material varies from the defined infeed range, the system 200 may utilize a model, which may be a machine-learned model 234, to determine whether a ground speed of the harvester 10 should be altered. In addition, the system 200 may utilize a model, which may be a machine-learned model 234, to determine an estimated change to the detected foliage ratio and/or whether an operation parameter of the primary extractor 66 should be changed, such as by increasing or decreasing in the speed setpoint for the primary extractor 66. The system 200 may further monitor the power source 20 load and alter one or more settings if the load is greater than a predefined foliage range. Further, the system 200 can monitor a chopper's hydraulic pressure to compensate for the change in the amount of harvested material being processed by the harvester 10.

In some examples, the operation model can correspond to a linear machine-learned model 234. For instance, in some embodiments, the operation model may be or include a linear regression model. A linear regression model may be used to intake the input data from the input device(s) 204 and provide an intermittent and/or continuous, numeric output value for the harvest-related parameters. Linear regression models may rely on various techniques, such as ordinary least squares, ridge regression, lasso, gradient descent, and/or the like. However, in other embodiments, the operation model may be or include any other suitable linear machine-learned model 234.

Additionally or alternatively, the operation model may correspond to a non-linear machine-learned model 234. For instance, in some embodiments, the operation model may be or include a neural network such as, for example, a convolutional neural network. Example neural networks include feed-forward neural networks, recurrent neural networks (e.g., long short-term memory recurrent neural networks), convolutional neural networks, transformer neural networks (or any other models that perform self-attention), or other forms of neural networks. Neural networks can include multiple connected layers of neurons and networks with one or more hidden layers, which can be referred to as "deep" neural networks. Typically, at least some of the neurons in a neural network include non-linear activation functions.

As further examples, the model can be or can otherwise include various other machine-learned models, such as a support vector machine; one or more decision-tree based models (e.g., random forest models); a Bayes classifier; a K-nearest neighbor classifier; and/or other types of models including both linear models and non-linear models.

In some examples, the computing system 202 can receive the one or more machine-learned models 234 from the machine learning computing system 208 over the network 206 and can store the one or more machine-learned models 234 in the memory 212. The computing system 202 can then use or otherwise run one or more machine-learned models 234 (e.g., by processor(s) 210).

The machine learning computing system 208 includes one or more processors 240 and a memory 242. The one or more processors 240 can be any suitable processing device such as described with reference to processor(s) 210. The memory 242 can include any suitable storage device such as described with reference to memory 212.

The memory 242 can store information that can be accessed by the one or more processors 240. For instance, the memory 242 (e.g., one or more non-transitory computer-readable storage mediums, memory devices) can store data 244 that can be obtained, received, accessed, written, manipulated, created, and/or stored. In some embodiments, the machine learning computing system 208 can obtain data from one or more memory device(s) that are remote from the system 208.

The memory 242 can also store computer-readable instructions 246 that can be executed by the one or more processors 240. The instructions 246 can be software written in any suitable programming language or can be implemented in hardware. Additionally, or alternatively, the instructions 246 can be executed in logically and/or virtually separate threads on the processor(s) 240.

For example, the memory 242 can store instructions 246 that when executed by the one or more processors 240 cause the one or more processors 240 to perform any of the operations and/or functions described herein.

In some embodiments, the machine learning computing system 208 includes one or more server computing devices.

If the machine learning computing system 208 includes multiple server computing devices, such server computing devices can operate according to various computing architectures, including, for example, sequential computing architectures, parallel computing architectures, or some combination thereof.

In addition or alternatively to the model(s) 234 at the computing system 202, the machine learning computing system 208 can include one or more machine-learned models 248. For example, the models 248 can be the same as described above with reference to the model(s) 234.

In some embodiments, the machine learning computing system 208 can communicate with the computing system 202 according to a client-server relationship. For example, the machine learning computing system 208 can implement the machine-learned models 248 to provide a web-based service to the computing system 202. For example, the web-based service can provide data analysis for determining harvest-related parameters as a service.

Thus, machine-learned models 234 can be located and used at the computing system 202, and/or machine-learned models 248 can be located and used at the machine learning computing system 208.

In some embodiments, the machine learning computing system 208 and/or the computing system 202 can train the machine-learned models 234 and/or 248 through the use of a model trainer 250. The model trainer 250 can train the machine-learned models 234 and/or 248 using one or more training or learning algorithms. One example training technique is backwards propagation of errors ("backpropagation"). Gradient-based (e.g., gradient-descent) or other training techniques can be used.

In some embodiments, the model trainer 250 can perform supervised training techniques using a set of training data 252. For example, the training data 252 can include input data from the input device(s) 204 that is associated with a known value for the target parameter (i.e., the harvest-related parameter). For instance, input data associated with the training dataset may be continuously collected, generated, and/or received while the harvest-related parameters are being monitored via a separate harvest monitoring means to provide matching or correlation datasets between the input data and the harvest-related data. In other embodiments, the model trainer 250 can perform unsupervised training techniques. The model trainer 250 can perform a number of generalization techniques to improve the generalization capability of the models being trained. Generalization techniques include weight decays, dropouts, or other techniques. The model trainer 250 can be implemented in hardware, software, firmware, or combinations thereof.

Thus, in some embodiments, the models can be trained at a centralized computing system (e.g., at "the factory") and then distributed to (e.g., transferred to for storage by) specific controllers. Additionally or alternatively, the models can be trained (or re-trained) based on additional training data generated by users of the system 200. This process may be referred to as "personalization" of the models and may allow users to further train the models to provide improved (e.g., more accurate) predictions for unique field and/or machine conditions experienced by such users.

The network(s) 280 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof and can include any number of wired or wireless links. Communication over the network(s) 280 can be accomplished, for instance, via a communications interface using any type of protocol, protection scheme, encoding, format, packaging, etc.

The machine learning computing system 208 may also include a communications interface 274 to communicate with any of the various other system components described herein.

FIGS. 4 and 5 illustrate example computing systems that can be used to implement the present disclosure. Other computing systems can be used as well. For example, in some embodiments, the computing system 202 can include the model trainer 250 and the training dataset 252. In such embodiments, the machine-learned models 234 can be both trained and used locally at the computing system 202. As another example, in some embodiments, the computing system 202 is not connected to other computing systems.

Figure 6:
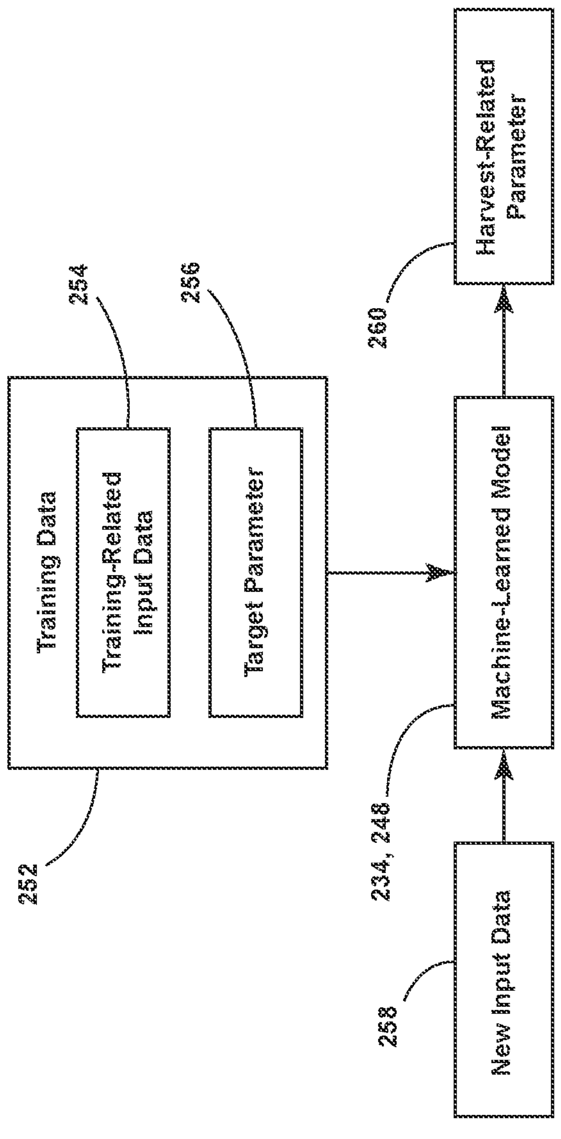
FIG. 6 illustrates a schematic view of a flow diagram for training a machine-learned model in accordance with aspects of the present subject matter.

Referring now to FIG. 6, a schematic view illustrating a flow diagram for training a machine-learned model, such as the machine-learned operation models 234, 248 described above, is illustrated in accordance with aspects of the present subject matter. As indicated above, the model(s) 234, 248 can be trained by a model trainer 250 that uses training data 252 and performs any suitable supervised and/or unsupervised training techniques. In several embodiments, as shown in FIG. 5, the model(s) 234, 248 may be trained using one or more training datasets including input data 254 that is associated with a known value for the target parameter 256 (i.e., the harvest-related parameter). For instance, in some embodiments, the input data 254 associated with the training dataset may be continuously collected, generated, and/or received (e.g., via the input device(s) 204) while both an agricultural harvester 10 is performing a harvesting operation within the field 24 and the target harvest-related parameter 256 is being monitored via a separate harvest monitoring means (e.g., by using a conventional harvest monitoring system that relies upon a sensor proximate to the elevator assembly 62 to monitor, for example, the foliage ratio).

By analyzing the input data 254 in combination with the known or target values 256 for the harvest-related parameter derived from the separate harvest monitoring means, suitable correlations may be established between the input data (including certain subsets of the input data) and the harvest-related parameter to develop a machine-learned model 234 that can accurately predict the harvest-related parameter based on new datasets including the same type of input data. For instance, in some implementations, suitable correlations may be established between the harvest-related parameter and various harvest-related conditions associated with or included within the input data, such as various sensed, calculated, and/or known parameters, settings, machine configurations, and/or operational statuses associated with the harvester 10 (e.g., the fan speed associated with the primary and/or secondary extractor 66, 90, the suction the associated with the primary and/or secondary extractor 66, 90, the pressure associated with the primary and/or secondary extractor 66, 90, hydraulic motor usage, engine speed, ground speed, elevator speed, base cutter height, base cutter pressure, chopper speed, chopper pressure, floating roller position or displacement, the vertical position or travel of the chassis or frame 12, base cutter direction (forward or reverse), whether the topper assembly 30 or suspension is being currently raised or lowered, the model/type of the chopper assembly 58, the size of the elevator assembly 62, tire/track conditions, and/or the like). As indicated above, in addition to using such harvester-based, harvest-related conditions to establish the desired correlations (or as an alternative thereto), suitable correlations may also be established between the harvest-related parameter and various other harvest-related conditions, such as field-based or application-based harvest-related conditions (e.g., conditions specific to the region within which the harvester 10 is operating, farm-specific conditions, time-related conditions (day/night), humidity data, field NDVI data, yield prediction data, power load data for the harvester 10, power load data for one or more components of the harvester 10, and/or the like).

As shown in FIG. 6, once the machine-learned model 234 has been trained, new datasets 258 can be input into the model to allow the model to predict or determine new estimated values 260 for the target harvest-related parameters. For instance, upon training the model, the input data collected, generated, and/or received during a subsequent harvesting operation can be input into the model to provide harvest-related data associated with such harvesting operation. In some embodiments, the model may be used to predict or determine values for the harvest-related parameter at a given frequency (e.g., the frequency at which new input data is being received) to allow such parameter to be continuously monitored as the harvesting operation is being conducted. As indicated above, such harvest-related data may then be used by the computing system 200 to generate an associated field map (e.g., a yield map), to present yield information to the operator (e.g., via the user interface 222), to automatically control the operation of the harvester 10, and/or to execute any other suitable control actions.

Figure 7:
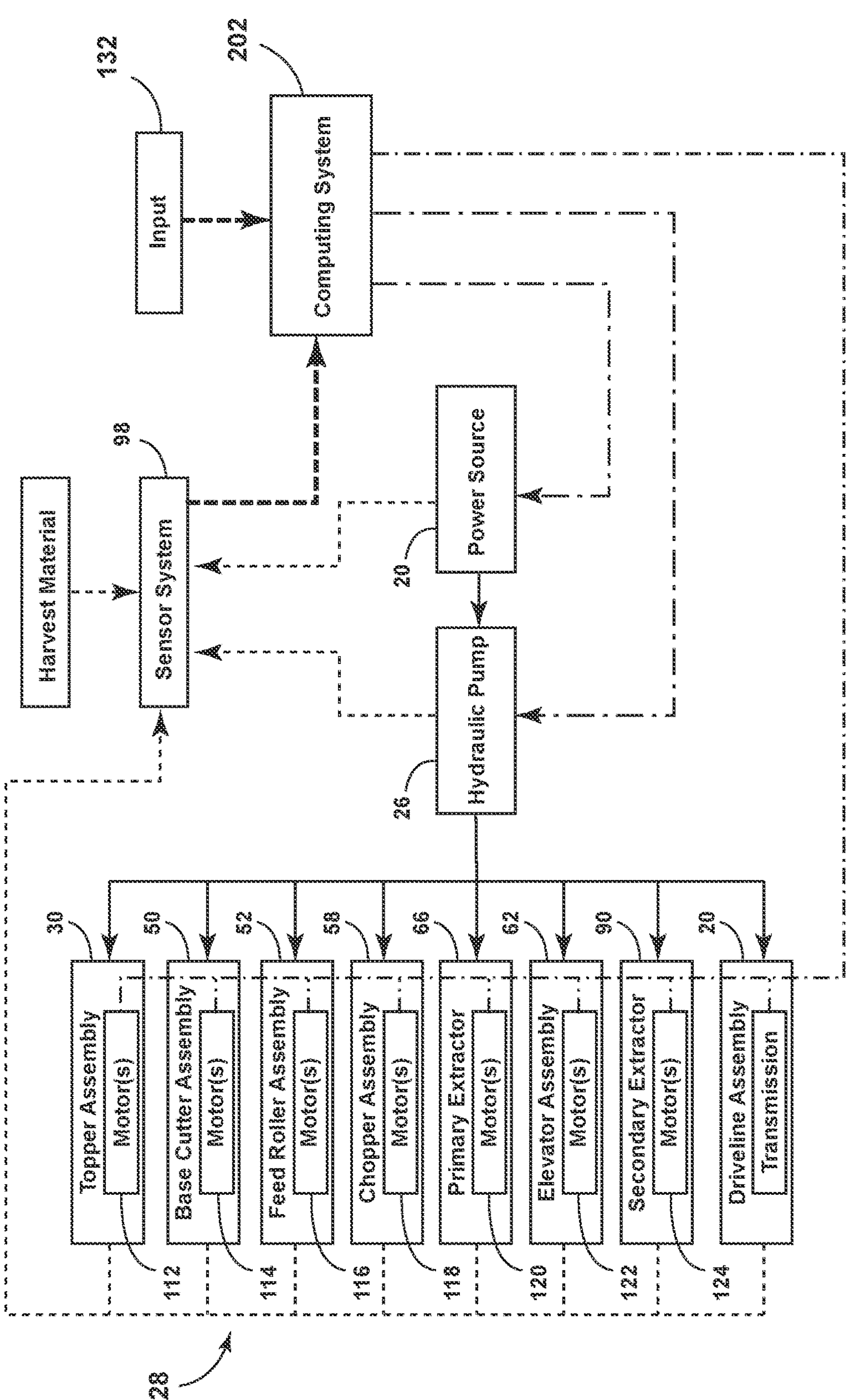
FIG. 7 is a schematic block diagram illustrating portions of the system of FIG. 3 in accordance with aspects of the present subject matter.

Referring now to FIG. 7, various components of the system 200 are illustrated in accordance with various aspects of the present disclosure. As shown, the computing system 202 may receive data from various components of the system 200, such as via one or more sensors, and, in turn, alter or manipulate the various components. In addition, as illustrated in FIG. 7, the power source 20 may power a hydraulic pump 26, which is further coupled with a hydraulic circuit 126. One or more additional components of the harvester 10 are operably coupled with the hydraulic circuit 126 and powered by hydraulic pressure produced by the pump 26.

As illustrated, the computing system 202 may receive an input 132 related to a defined ground speed and/or a defined foliage ratio. In various instances, the input 132 may be received from a component of the harvester 10, such as a user interface 222 (FIG. 3). Additionally or alternatively, the input 132 may be received from a device that is remote from the harvester 10. Additionally or alternatively, the input 132 may be provided in any other suitable way, such as from a predetermined look-up table stored in the computing system 202.

The computing system 202 may also receive data associated with the various components from a sensor system 98 that includes one or more sensors. For example, the sensor system 98 may capture data associated with one or more conditions of the harvester 10. In various instances, the data may include a power source load, hydraulic motor usage, hydraulic pressure at various locations within the hydraulic circuit 126 (e.g., a hydraulic pressure at the chopper assembly), engine speed, ground speed, elevator speed, base cutter height, base cutter pressure, chopper speed, chopper pressure, floating roller position or displacement, the vertical position or travel of the chassis or frame 12, base cutter direction (forward or reverse), whether the topper assembly 30 or suspension is being currently raised or lowered, the model/type of the chopper assembly 58, the size of the elevator assembly 62, tire/track conditions, and/or the like. The input data may additionally include images or other vision-based data indicative of the upcoming infeed volume of harvested material and/or the debris 64 and/or stalks 60S, or billets 60B, (i.e., detected foliage ratio) downstream of the primary extractor 66.

The computing system 202 may analyze the input data to determine one or more harvest-related parameters. For example, the data analysis module 232 of the computing system 202 can cooperatively operate with or otherwise leverage a machine-learned model 234 to analyze the input data to determine the one or more harvest-related parameters. In some examples, the data analysis module 232 may determine if the infeed volume deviates from a defined infeed range while operating at an initial speed command. In such cases, if the infeed volume is within the defined infeed range, the speed command may be maintained. If the infeed volume is below the defined infeed range, a control action in the form of an updated speed command to slow the harvester 10 may be generated. If the infeed volume is above the defined infeed range, a control action in the form of an updated speed command to speed up the harvester 10 may be generated.

Additionally or alternatively, the data analysis module 232 may determine whether the hydraulic pressure powering the chopper assembly is within a defined pressure range while operating at an initial speed command. In such cases, if the hydraulic pressure is within the defined pressure range, the speed command may be maintained. If the hydraulic pressure is below the defined pressure range, a control action in the form of an updated speed command to slow the harvester 10 may be generated. If the hydraulic pressure is above the defined pressure range, a control action in the form of an updated speed command to speed up the harvester 10 may be generated.

Additionally or alternatively, the data analysis module 232 may determine whether the detected foliage ratio deviates from a defined foliage range while operating at an initial speed command. In such cases, if the detected foliage ratio is within the defined foliage range, the speed command may be maintained. If the hydraulic pressure is below the defined foliage range, a control action in the form of an updated speed command to slow the harvester 10 may be generated. If the foliage pressure is above the defined pressure range, a control action in the form of an updated speed command to speed up the harvester 10 may be generated.

Additionally or alternatively, the data analysis module 232 may determine whether the hydraulic pressure powering the base cutter assembly is within a defined pressure range while operating at an initial speed command. In such cases, if the hydraulic pressure is within the defined pressure range, the speed command may be maintained. If the hydraulic pressure is below the defined pressure range, a control action in the form of an updated speed command to slow the harvester 10 may be generated. If the hydraulic pressure is above the defined pressure range, a control action in the form of an updated speed command to speed up the harvester 10 may be generated.

Based on the adjustment to any component of the system, the computing system 202 may receive updated input data and determine whether any additional components are to be adjusted. For example, in some instances, one or more components may be adjusted based on an adjustment to the ground speed to maintain the power source 20 within a defined operating range. For example, the defined operating range may be a defined speed range (e.g., RPM range) for which the power source 20 may operate in an efficient manner. In such instances, as a first component other than the driveline assembly 22 uses more power, hydraulic pressure may be reduced to the driveline assembly 22 such that the power source 20 maintains operation within the defined operating range. Conversely, as the first component other than the driveline assembly 22 uses less power, hydraulic pressure may be increased to the driveline assembly 22 such that the power source 20 maintains operation within the defined operating range. As such, the system may allow for closed-loop control of the harvester 10 in which various components are controlled and the ground speed of the harvester 10 is altered to maintain the power source 20 within a defined operating range.

Figure 8:
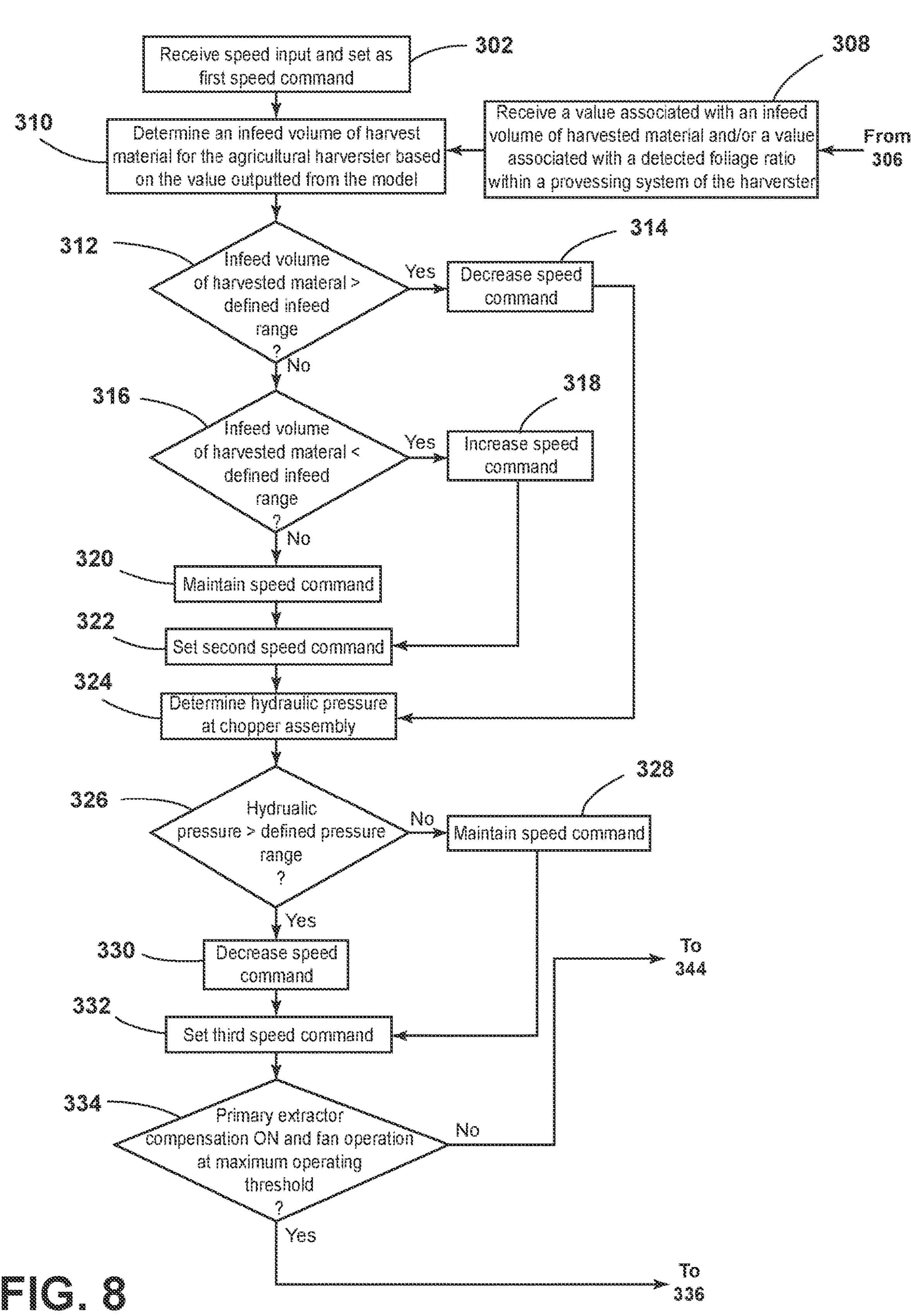
FIG. 8 illustrates a flow diagram of a method for a harvesting operation in accordance with aspects of the present subject matter.
Figure 8:
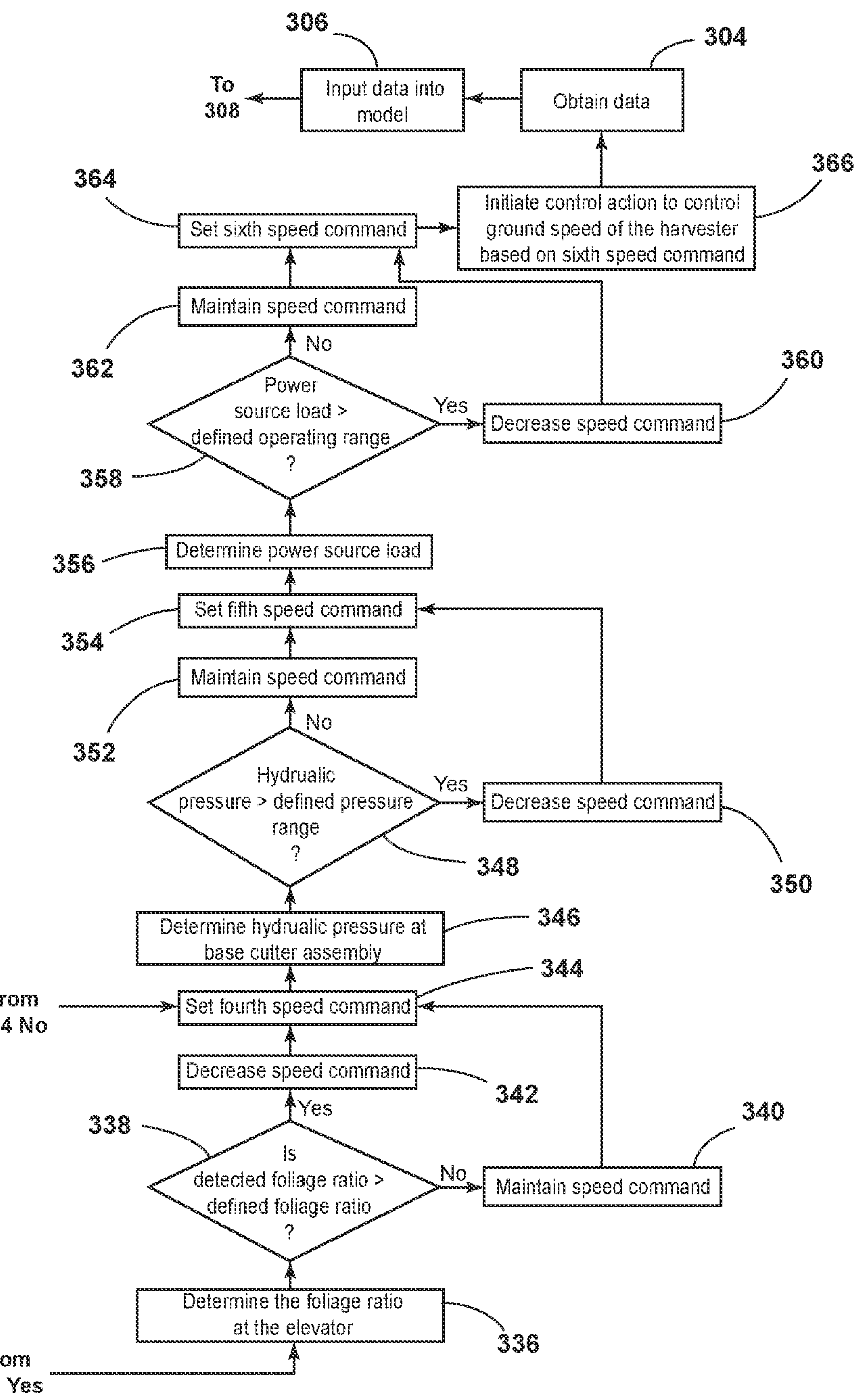

Referring now to FIG. 8, a flow diagram of a method 300 for operating an agricultural harvester is illustrated in accordance with aspects of the present subject matter. In general, the method 300 will be described herein with reference to the agricultural harvester 10 and related components described with reference to FIGS. 1-3, and the various components of the system 200 described with reference to FIGS. 4-7. It will be appreciated, however, that the disclosed method 300 may be implemented with harvesters having any other suitable configurations and/or within systems having any other suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

In the method of FIG. 8, various intermediate speed commands are set based on the analysis of various conditions of the harvester and/or the harvest-related parameters. As illustrated, each of the conditions of the harvester and/or the harvest-related parameters may be subsequently analyzed to determine each subsequent speed command. However, it will be appreciated that one or more of the conditions of the harvester and/or the harvest-related parameters may be analyzed contemporaneously, and a speed command may be updated based on the most recent received speed command. Similarly, in the illustrated example, data is obtained and inputted into a model prior to each of the intermediate speed commands is determined for clarity purposes. However, it will be appreciated that data may be obtained and inputted into the model at any time during the method without departing from the teachings provided herein.

As shown in FIG. 8, at (302), the method 300 may include receiving a defined speed command for the harvesting operation. The defined speed command may be a speed for which the harvester is to maintain until halted, either by the computing system and/or by an operator. In various instances, the speed command may be defined and/or received through various methods, such as through the user interface and/or chosen based on stored data within the system. Based on the defined speed command, or any other information, a first ground speed of the harvester may be defined, which is then maintained by the driveline assembly.

As shown in FIG. 7, at (304), the method 300 may include obtaining data associated with one or more operation-related conditions for an agricultural harvester. For instance, as described above, the computing system may be communicatively coupled to one or more input devices configured to collect or generate data associated with one or more operation-related conditions for an agricultural harvester, thereby allowing the data collected or generated by such device(s) to be transmitted to the computing system. As indicated above, operation-related conditions can include, but are not limited to, harvest-related parameters and settings of the harvester (e.g., sensed or calculated harvest-related parameters or operator-selected settings), vehicle commands for the harvester, vehicle configuration settings, application-related conditions, field-related conditions, and/or the like. For instance, operation-related condition data may include, but is not limited to, data associated with any one or a combination of the engine speed, ground speed, elevator speed, base cutter height, base cutter pressure, chopper speed, chopper pressure, floating roller position or displacement, the vertical position or travel of the chassis or frame, the fan speed associated with the primary and/or secondary extractor, hydraulic motor usage, foliage ratio, base cutter direction (forward or reverse), raising or lowering of the topper assembly, raising or lowering of the suspension, the model/type of the chopper assembly, the size of the elevator assembly, tire/track conditions, the region within which the harvester is operating, farm-specific conditions, time-related conditions (day/night), humidity data, field NDVI data, yield prediction data, power load data for the harvester, power load data for one or more components of the harvester, and/or the like.

In some embodiments, the input data may correspond to a dataset collected or generated at a given time, such as by including instantaneously sensed or calculated operation-related conditions of the harvester and/or sensed or calculated operating parameters of the harvester as the harvester is performing a harvesting operation within a field. Thus, in some embodiments, the method 300 can be performed iteratively for each new input dataset as such dataset is received. For example, the method 300 can be performed iteratively in real-time as new data is received from the input devices 204 while the harvester is moved throughout the field. As an example, the method 300 can be performed iteratively in real-time as new sensor data is received from the sensor system that is physically located on the harvester.

Additionally, at (306), the method 300 may include inputting the data into an operation model configured to receive and process the data to determine one or more harvest-related parameters for the agricultural harvester. For example, as indicated above, the computing system may be configured to leverage a machine-learned model that is configured to receive and process input data associated with one or more operation-related conditions for the agricultural harvester to determine the one or more harvest-related parameters.

In some embodiments, the inputted data can correspond to or otherwise include an entirety of the input dataset, such that all of the input data received from the input devices is analyzed. In other embodiments, the inputted data can correspond to or otherwise include only a portion or subset of the input data received from the input devices. Using only a subset of the data can enable reductions in processing time and requirements.

At (308), the method 300 can include receiving a first value for the harvest-related parameter as a first output of the machine-learned model and/or a second value for the harvest-related parameter as a second output of the machine-learned model. In various examples, the first harvest-related parameter can be indicative of an infeed volume of harvest material for the agricultural harvester, a change in infeed volume of harvest material, a change in a magnitude of infeed volume of harvest material, and/or any other parameter associated with the infeed volume of harvest material. Additionally, in some examples, the second harvest-related parameter can be indicative of a detected foliage ratio within a processing system of the harvester and/or any other parameter associated with the processing system.

At (310), the method 300 can include determining an infeed volume of harvested material for the agricultural harvester based on the value outputted from the model. At (312), the method 300 includes determining whether the infeed volume of harvested material is greater than a defined infeed range. In some cases, various issues may be more likely when the infeed volume exceeds the defined infeed range, such as a choking condition. If the infeed volume of harvested material is greater than the defined infeed range at (308), the method 300, at (314) can include generating a command to decrease the speed command by a factor. In some cases, the factor may be proportional to a difference between the detected infeed volume and the defined infeed range. Once the speed command is generated at (314), a second speed command may be set at (322), which is less than the first speed command.

If the infeed volume of harvested material does not exceed the defined infeed range, at (316), the method 300 can include determining whether the infeed volume of harvested material is less than the defined infeed range. If the infeed volume of harvested material is less than the defined infeed range, at (318), the method 300 can include generating a command to increase the speed command by a factor. In some cases, the factor may be proportional to a difference between the detected infeed volume and the defined infeed range. Once the speed command is generated at (318), a second speed command may be set at (322), which is less than the first speed command. If the infeed volume of harvested material is not less than the defined infeed range, at (320), the method 300 can include generating a command to maintain the speed command. Once the speed command is generated at (320), a second speed command may be set at (322), which may be generally equal to the first speed command.

At (324), the method can include determining a hydraulic pressure at the chopper assembly. As provided herein, a sensor system may be capable of determining various conditions of the components of the harvester, including the chopper assembly. The components, coupled to the hydraulic circuit in parallel, can each draw a unique amount of hydraulic pressure from a hydraulic circuit to function in the defined operational settings. In some cases, based on operational conditions, more or less hydraulic pressure may be needed for various components to operate in the defined setting. For instance, when the infeed volume of harvested material increases, the volume of harvested material through the chopper assembly also increases. To accommodate the increased volume, the chopper assembly may require additional hydraulic pressure. However, the additional hydraulic pressure may increase the power load on the power source. For these reasons and/or for any other reason, the chopper assembly may be operated within a defined pressure range.

At (326), the method 300 can include determining whether the chopper assembly pressure is greater than the defined pressure range. If the chopper assembly pressure is not greater than the defined pressure range, at (328), the method 300 can include generating a command to maintain the speed command. Once the speed command is generated at (328), a third speed command may be set at (332), which may be generally equal to the second speed command when the speed command is generated at (328). If the chopper assembly pressure is greater than the defined pressure range, at (330), the method 300 can include generating a command to decrease the speed command by a factor. In some cases, the factor may be proportional to a difference between the detected chopper assembly pressure and the defined pressure range. Once the speed command is generated at (330), a second speed command may be set at (332), which may be less than the second speed command when the speed command is generated at (330).

At (334), the method 300 can include determining whether a primary extractor compensation for a primary extractor is activated. The primary extractor compensation may be configured to update a force or suction of the primary extractor based on a detected foliage ratio, and/or any other factors, conditions, or harvest-related parameters. In addition, at (334), the method can further include determining whether the fan of the primary extractor is operating at a maximum threshold. If the primary extractor compensation is not activated and/or the fan of the primary extractor is not operating at or near the maximum operating threshold, at (344), the method 300 can include setting a fourth speed command, which may be equal to the third speed command set at (332).

If the primary extractor compensation is activated and/or the fan of the primary extractor is operating at or near the maximum operating threshold, at (336), the method 300 can include determining a detected foliage ratio based on the value outputted from the model.

At (338), the method 300 can include determining whether the detected foliage ratio is greater than a defined foliage ratio. In various instances, the defined foliage ratio may be defined and/or received through various methods, such as through the user interface and/or chosen based on stored data within the system. If the detected foliage ratio is not greater than a defined foliage ratio, at (340), the method 300 can include generating a command to maintain the speed command. Once the speed command is generated at (340), a fourth speed command may be set at (344), which may be generally equal to the third speed command. If the detected foliage ratio is greater than a defined foliage ratio, at (342), the method 300 can include generating a command to decrease the speed command by a factor. In some cases, the factor may be proportional to a difference between the detected foliage ratio and the defined foliage ratio. Once the speed command is generated at (342), a fourth speed command may be set at (344), which may be less than the third speed command when the speed command is generated at (342).

At (346), the method can include determining a hydraulic pressure at the base cutter assembly. As provided herein, a sensor system may be capable of determining various conditions of the components of the harvester, including the base cutter. The components, coupled to the hydraulic circuit in parallel, can each draw a unique amount of hydraulic pressure from a hydraulic circuit to function in the defined operational settings. In some cases, based on operational conditions, more or less hydraulic pressure may be needed for various components to operate in the defined setting. For instance, when the infeed volume of harvested material increases, the volume of harvested material through the base cutter assembly also increases. To accommodate the increased volume, the base cutter assembly may require additional hydraulic pressure. However, the additional hydraulic pressure may increase the power load on the power source. For these reasons and/or for any other reason, the base cutter assembly may be operated within a defined pressure range.

At (348), the method 300 can include determining whether the base cutter assembly pressure is greater than the defined pressure range. If the base cutter assembly pressure is greater than the defined pressure range, at (350), the method 300 can include generating a command to decrease the speed command by a factor. In some cases, the factor may be proportional to a difference between the detected base cutter assembly pressure and the defined pressure range. Once the speed command is generated at (350), a fifth speed command may be set at (354), which may be less than the fourth speed command when the speed command is generated at (350). If the base cutter assembly pressure is not greater than the defined pressure range, at (352), the method 300 can include generating a command to maintain the speed command. Once the speed command is generated at (352), a fifth speed command may be set at (354), which may be generally equal to the fourth speed command when the speed command is generated at (352).

At (356), the method 300 can include determining a power source load based on the harvester operations. At (358), the method 300 can include comparing the power source load to the defined operating range. The defined operating range may be an efficiency range in which the power source may be operated above a defined efficiency. For example, in some instances, the operating range may be between 1,500-2,500 revolutions per minute (RPM) when the power source is a combustion engine. However, it will be appreciated that based on the design of the power source, the type of the power source, etc., the defined operating range may vary from one harvester to another.

If the power source load is greater than the defined operating range, at (360), the method 300 can include generating a command to decrease the speed command by a factor. In some cases, the factor may be proportional to a difference between the power source load and the defined operating range. Once the speed command is generated at (360), a sixth speed command may be set at (364), which may be less than the fifth speed command when the speed command is generated at (360). If the power source load is not greater than the defined operating range, at (362), the method 300 can include generating a command to maintain the speed command. Once the speed command is generated at (362), a sixth speed command may be set at (364), which may be generally equal to the fifth speed command when the speed command is generated at (362).

At (366), the method 300 can include initiating a control action to control the ground speed of the harvester based on the sixth speed command. As provided herein, the ground speed of the harvester may be altered by increasing or decreasing a hydraulic pressure to the driveline assembly. Additionally or alternatively, the ground speed of the harvester may be adjusted in any other manner.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for an agricultural harvester, the system comprising:

one or more processors; and one or more non-transitory computer-readable media that collectively store:

a machine-learned model that receives data associated with one or more harvest-related conditions for the agricultural harvester and process the data to determine a first harvest-related parameter associated with an infeed volume of harvest material for the agricultural harvester, the infeed volume defining a metric quantifying an amount or volume of crop that enters a processing system of the harvester during a defined time period, the processing system including a topper assembly and a base cutter downstream of the topper assembly; and instructions that, when executed by the one or more processors, perform operations, the operations comprising:

obtaining the data associated with the one or more harvest-related conditions;

inputting the data into the machine-learned model that receives and processes the data to determine a first harvest-related parameter indicative of an infeed volume of harvested material for the agricultural harvester;

receiving a first value for the harvest-related parameter as a first output of the machine-learned model; and altering a ground speed command of the agricultural harvester based at least in part on the first harvest-related parameter to maintain a hydraulic pressure within a defined pressure range, the hydraulic pressure powering the processing system and a driveline assembly.

2. The system of claim 1, The system of claim 1, wherein the operations further comprise:

initiating a control action for the agricultural harvester based at least in part on the first harvest-related parameter.

3. The system of claim 1, wherein the first harvest-related parameter is indicative of a change in an infeed volume of harvest material.

4. The system of claim 1, wherein the first harvest-related parameter is indicative of a change in a magnitude of infeed volume of harvest material.

5. The system of claim 1, wherein the machine-learned model is-further processes the data to determine a second harvest-related parameter for the agricultural harvester, and wherein the operations further comprise:

receiving a second value for the harvest-related parameter as a second output of the machine-learned model.

6. The system of claim 5, wherein the second harvest-related parameter is indicative of a detected foliage ratio within the processing system of the harvester.

7. The system of claim 5, wherein the operations further comprise:

initiating a control action for the agricultural harvester based at least in part on the first harvest-related parameter and the second harvest-related parameter.

8. A computer-implemented method for agricultural harvesting, the computer-implemented method comprising:

receiving, by a computing system, data associated with one or more harvest-related conditions for an agricultural harvester;

inputting, by the computing system, the data into a machine-learned model configured to that receives and processes the data to determine a first harvest-related parameter indicative of an infeed volume of harvested material for the agricultural harvester;

receiving, by the computing system, a value for the first harvest-related parameter as an output of the machine-learned model; and altering, by the computing system, a ground speed command of the agricultural harvester based at least in part on the first harvest-related parameter to maintain a hydraulic pressure within a defined pressure range, the hydraulic pressure powering a processing system and a driveline assembly.

9. The computer-implemented method of claim 8, wherein the machine-learned model further processes the data to determine a second harvest-related parameter indicative of a detected foliage ratio.

10. The computer-implemented method of claim 9, wherein altering the ground speed command of the agricultural harvester is further based at least in part on the second harvest-related parameter.

11. The computer-implemented method of claim 8, further comprising:

generating a yield map based at least in part on the first harvest-related parameter.

12. The computer-implemented method of claim 8, wherein:

the computing system is physically located on the agricultural harvester; and obtaining the data associated with one or more harvest-related conditions comprises obtaining data associated with the one or more harvest-related conditions from a source physically located on the agricultural harvester.

13. The computer-implemented method of claim 9, wherein:

the computing system is physically located on the agricultural harvester; and obtaining the data associated with one or more harvest-related conditions comprises obtaining data associated with the one or more harvest-related conditions from a source located remote from the agricultural harvester.

14. The computer-implemented method of claim 9, further comprising:

altering a speed of a fan of a primary extractor based at least in part on the second harvest-related parameter.

15. A computer-implemented method for agricultural harvesting, the computer-implemented method comprising:

receiving, by a computing system, data associated with one or more harvest-related conditions for an agricultural harvester, the data associated with harvested material upstream of a processing system that separates the harvested material from a field;

inputting, by the computing system, the data into a machine-learned model that receives and processes the data to determine a first harvest-related parameter indicative of a detected foliage ratio for the agricultural harvester;

receiving, by the computing system, a value for the first harvest-related parameter as an output of the machine-learned model; and altering, by the computing system, a ground speed command of the agricultural harvester based at least in part on the first harvest-related parameter to maintain a hydraulic pressure within a defined pressure range, the hydraulic pressure powering a processing system and a driveline assembly.

16. The computer-implemented method of claim 15, wherein the machine-learned model further processes the data to determine a second harvest-related parameter indicative of an infeed volume of harvested material for the agricultural harvester.

17. The computer-implemented method of claim 16, wherein altering the ground speed command of the agricultural harvester is further based at least in part on the second harvest-related parameter.

18. The computer-implemented method of claim 15, further comprising:

generating a yield map based at least in part on the first harvest-related parameter.

19. The computer-implemented method of claim 15, further comprising:

altering a speed of a fan of a primary extractor based at least in part on the first harvest-related parameter.

* * * * *